United States Patent
Dunjic et al.

(10) Patent No.: US 11,144,921 B2
(45) Date of Patent: Oct. 12, 2021

(54) GENERATION AND PROVISIONING OF DIGITAL TOKENS BASED ON DYNAMICALLY OBTAINED CONTEXTUAL DATA

(71) Applicant: The Toronto-Dominion Bank, Toronto (CA)

(72) Inventors: Milos Dunjic, Oakville (CA); Arthur Carroll Chow, Markham (CA); Anthony Haituyen Nguyen, Toronto (CA); Casey Lyn Doyle, Ajax (CA); Yubing Liu, Toronto (CA); Het Anand Patel, Mississauga (CA); Stephen John McCann, Toronto (CA); Perry Aaron Jones Haldenby, Toronto (CA); David Tax, Toronto (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 135 days.

(21) Appl. No.: 15/946,132

(22) Filed: Apr. 5, 2018

(65) Prior Publication Data
US 2019/0311364 A1 Oct. 10, 2019

(51) Int. Cl.
G06Q 20/40 (2012.01)
G06Q 20/32 (2012.01)
G06N 20/00 (2019.01)

(52) U.S. Cl.
CPC ......... *G06Q 20/4014* (2013.01); *G06N 20/00* (2019.01); *G06Q 20/322* (2013.01)

(58) Field of Classification Search
CPC ............ H04L 2209/38; H04L 63/0428; H04L 2209/56; H04L 63/0861; H04L 67/18;
(Continued)

(56) References Cited

U.S. PATENT DOCUMENTS 8,566,197 B2  10/2013 Satyavolu et al.
9,082,119 B2  7/2015 Ortiz et al.
(Continued)

OTHER PUBLICATIONS

Xiao et al., "An Approach for Context-aware Service Discovery and Recommendation," IEEE International Conference on Web Services, 2010 (8 pages).
(Continued)

*Primary Examiner* — Alexander G Kalinowski
*Assistant Examiner* — Sanjeev Malhotra
(74) *Attorney, Agent, or Firm* — Duane Morris LLP

(57) ABSTRACT

The disclosed exemplary embodiments include computer-implemented systems, apparatuses, and processes that, among other things, generate and provision digital tokens based on dynamically obtained contextual data. For example, an apparatus may receive first information that characterizes an exchange of data initiated by a first application program executed by the apparatus, and may generate and transmit a signal to a computing system through a programmatic interface associated with a second application program executed by the apparatus. In some instances, the first signal may include the first information and data that instructs the computing system to obtain a digital token representative of a data type available for use in the data exchange. The apparatus may also receive a second signal that includes the digital token and based on the digital token, perform operations that present second information characterizing the available data type on an interface.

19 Claims, 12 Drawing Sheets

(58) Field of Classification Search
CPC ..... H04L 9/0844; H04L 9/3231; G06Q 20/10;
G06Q 20/20; G06Q 20/40; G06Q
2220/00; G06Q 10/083; G06Q 20/102;
G06Q 20/12; G06Q 20/204; G06Q
20/206; G06Q 20/3224; G06Q 20/356;
G06Q 20/3821; G06Q 30/0635; G06F
21/602; G06F 21/604; G06F 21/6245;
G06F 2221/2143; G06F 9/45533; G10L
15/22; G10L 15/30; H04W 12/02
USPC ................. 709/223, 224; 726/23; 455/426.1;
700/11; 702/39; 701/14; 710/16;
705/37, 39
See application file for complete search history.

(56) References Cited

U.S. PATENT DOCUMENTS

| | | | |
|---|---|---|---|
| 9,524,501 | B2 | 12/2016 | Weber |
| 9,582,598 | B2 | 2/2017 | Kalgi |
| 9,582,801 | B2 | 2/2017 | Hammad |
| 2002/0143698 | A1* | 10/2002 | Shiramizu ............... G06Q 20/10 705/39 |
| 2003/0212505 | A1* | 11/2003 | Rojas .................... C21C 5/4673 702/39 |
| 2007/0118232 | A1* | 5/2007 | Kresse ............... G05B 19/0423 700/11 |
| 2008/0311903 | A1* | 12/2008 | Levin .................. H04L 65/1069 455/426.1 |
| 2010/0257287 | A1* | 10/2010 | Bischof .................. G01D 9/005 710/16 |
| 2011/0054721 | A1* | 3/2011 | Goodrich ........... G05B 23/0283 701/14 |
| 2012/0030047 | A1 | 2/2012 | Fuentes et al. |
| 2013/0254102 | A1 | 9/2013 | Royyuru |
| 2013/0297504 | A1 | 11/2013 | Nwokolo et al. |
| 2014/0074637 | A1 | 3/2014 | Hammad |
| 2014/0108261 | A1 | 4/2014 | Priest et al. |
| 2014/0351035 | A1 | 11/2014 | Fish et al. |
| 2015/0081501 | A1* | 3/2015 | Chakar .................. G06Q 40/04 705/37 |
| 2016/0043916 | A1* | 2/2016 | Ramaswamy ..... H04N 21/2353 709/224 |
| 2017/0061466 | A1 | 3/2017 | Srivastava |
| 2018/0039785 | A1* | 2/2018 | Naqvi .................. G06Q 20/308 |
| 2018/0039786 | A1* | 2/2018 | Naqvi .................. H04L 9/3231 |
| 2018/0091506 | A1* | 3/2018 | Chow .................. G06Q 20/085 |
| 2018/0150647 | A1* | 5/2018 | Naqvi .................... G06F 21/602 |
| 2018/0158052 | A1* | 6/2018 | Tseretopoulos .... G06Q 20/3829 |
| 2018/0189781 | A1* | 7/2018 | McCann ............... G06Q 20/202 |
| 2018/0276666 | A1* | 9/2018 | Haldenby .............. G06Q 20/20 |
| 2018/0365024 | A1* | 12/2018 | Kiriakou ................ G06Q 20/20 |
| 2018/0365670 | A1* | 12/2018 | Dunjic ................. G06Q 20/206 |
| 2019/0103112 | A1* | 4/2019 | Walker ................ G10L 15/1815 |
| 2019/0109915 | A1* | 4/2019 | McPhee .................. G06Q 20/40 |
| 2019/0149567 | A1* | 5/2019 | Bailey .................... H04L 41/20 726/23 |
| 2019/0149623 | A1* | 5/2019 | McPhee ................. H04L 67/18 709/223 |
| 2019/0156326 | A1* | 5/2019 | Todasco ................. H04W 4/80 |
| 2019/0172038 | A1* | 6/2019 | Dunjic ................. G06Q 20/206 |
| 2019/0172045 | A1* | 6/2019 | Dunjic ................... H04L 67/10 |
| 2019/0220245 | A1* | 7/2019 | Martel .................... G10L 15/30 |
| 2019/0238517 | A1* | 8/2019 | D'Agostino ........ H04L 63/0807 |
| 2019/0251544 | A1* | 8/2019 | D'Agostino ....... G06Q 20/3224 |

OTHER PUBLICATIONS

Pezold, "Securing and Tokenizing Sensitive Data with Browser Based Encryption," TokenEx, Nov. 2, 2016 (12 pages).
Koch, "The Browser Perspective," retrieved from https://www.w3.org/2015/06/browser_perspective.pdf on Apr. 5, 2018 (33 pages).
American Express, "American Express and TNS Launch New Payment Service Provider," Apr. 4, 2012 (2 pages).
Visa, Inc., Transcript of Barclays Emerging Payments Forum, Mar. 24, 2015 (22 pages).

* cited by examiner

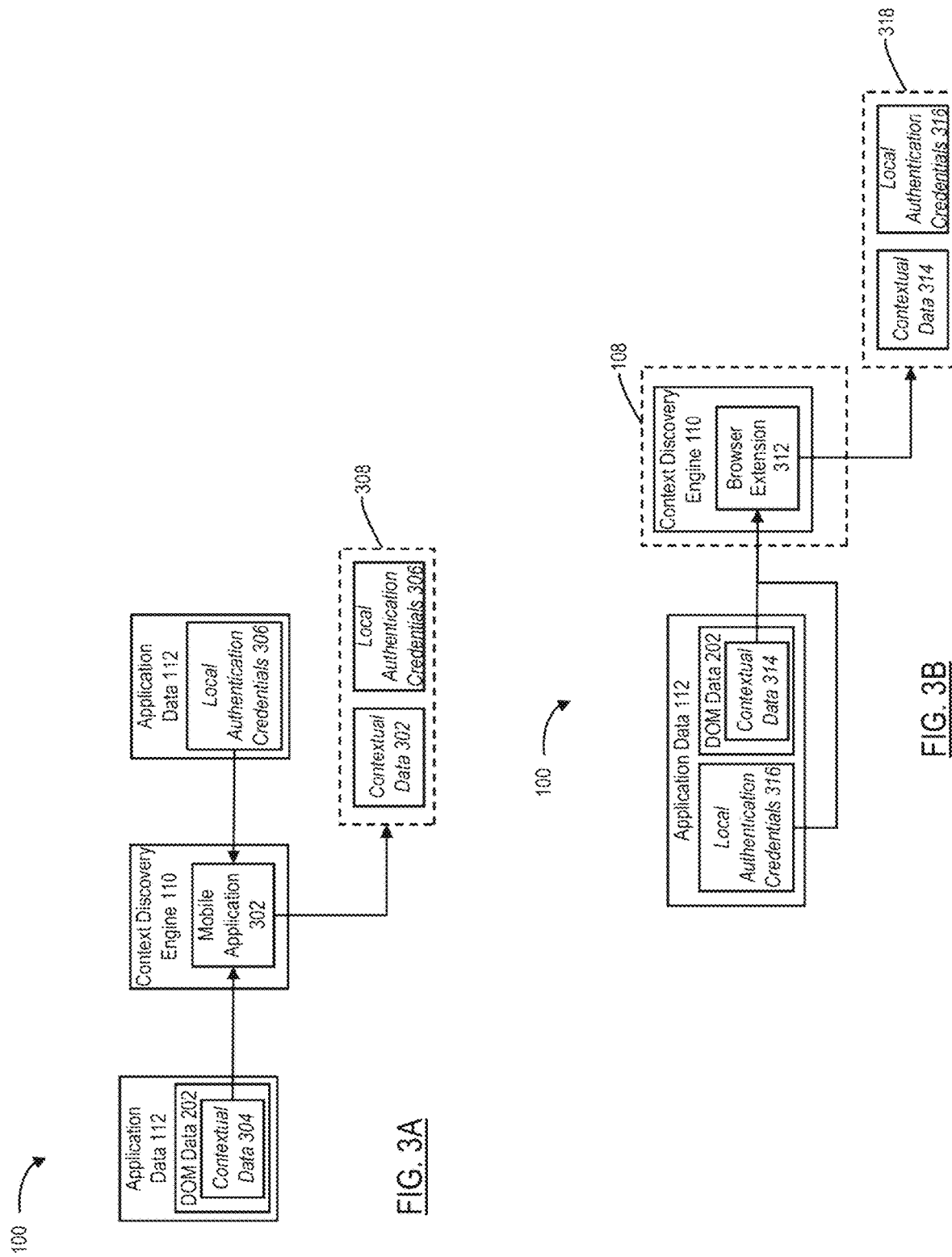

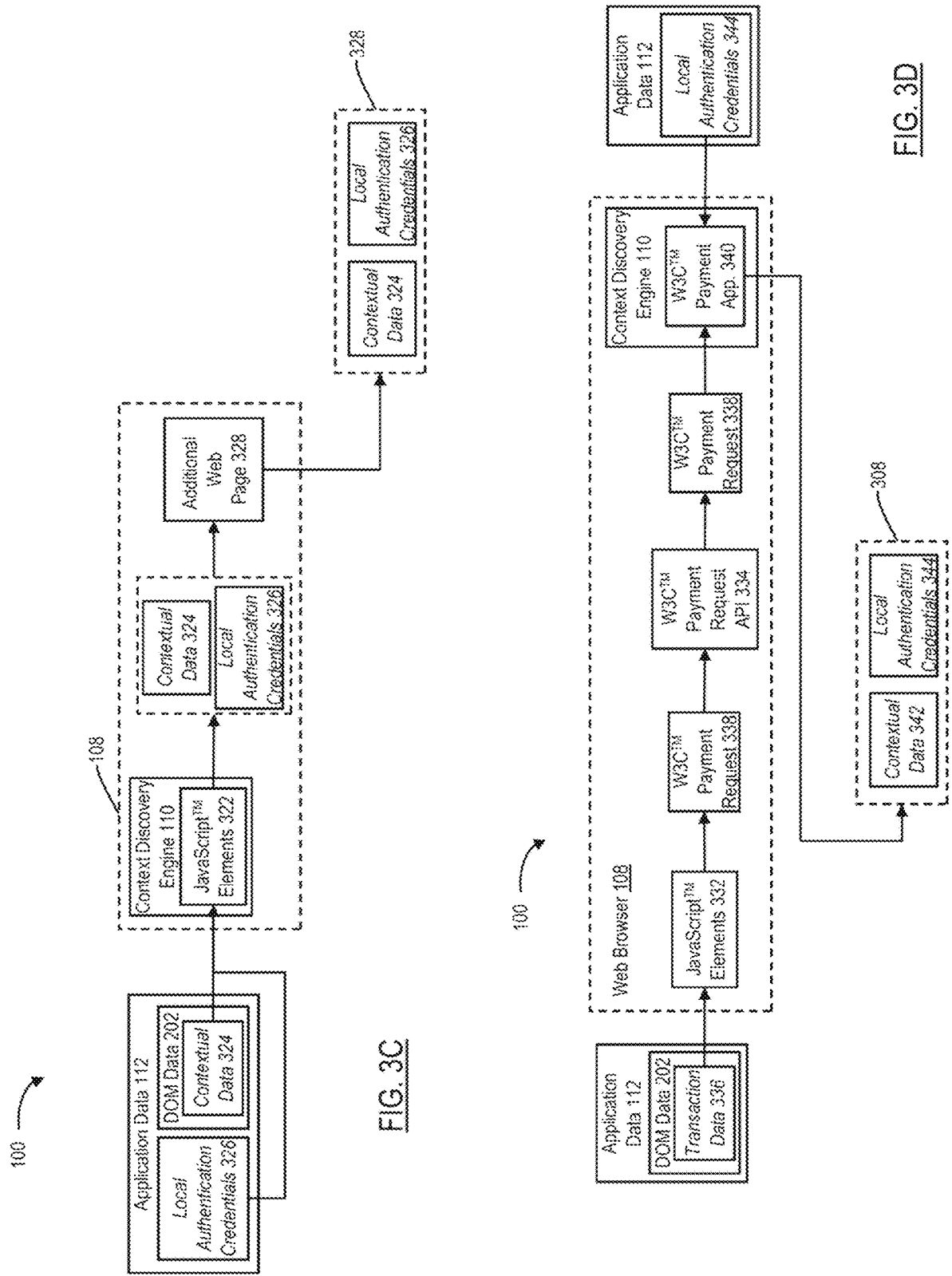

US 11,144,921 B2

GENERATION AND PROVISIONING OF DIGITAL TOKENS BASED ON DYNAMICALLY OBTAINED CONTEXTUAL DATA

TECHNICAL FIELD

The disclosed embodiments generally relate to computer-implemented systems and processes that generate and provision digital tokens based on dynamically obtained contextual data.

BACKGROUND

Today, payment systems and related technologies continuously evolve in response to advances in payment instruments, such as the ongoing transition from physical transaction cards to digital payment instruments maintained on mobile devices. These innovations result in additional mechanisms for submitting payment to an electronic or physical merchant, and for flexibly funding transactions initiated by the electronic or physical merchant.

SUMMARY

In some example, a device includes a communications unit, a storage unit storing instructions, and at least one processor coupled to the communications unit and the storage unit. The at least one processor is configured to execute the instructions to obtain first information that characterizes an exchange of data initiated by a first application program executed by the at least one processor, and to generate and transmit, via the communications unit, a first signal to a computing system. The first signal may be transmitted through a programmatic interface associated with a second application program executed by the at least one processor, and the first signal may include the first information and data that instructs the computing system to obtain a digital token representative of a data type available for use in the data exchange. The at least one processor is also configured to receive, via the communications unit, a second signal that includes the digital token and based on the digital token, perform operations that present second information characterizing the available data type on an interface.

In additional examples, a computer-implemented method includes obtaining, by at least one processor, first information that characterizes an exchange of data initiated by an executed first application program, and generating and transmitting, by the at least one processor, a first signal to a computing system. The first signal may be transmitted through a programmatic interface associated with a second application program executed by the at least one processor, and the first signal may include the first information and data that instructs the computing system to obtain a digital token representative of a data type available for use in the data exchange. The computer-implemented method also includes receiving, by the at least one processor, a second signal that includes the digital token and based on the digital token, performing, by the at least one processor, operations that present second information characterizing the available data type on a corresponding interface.

Further, in some examples, an apparatus includes a communications unit, a storage unit storing instructions, and at least one processor coupled to the communications unit and the storage unit. The at least one processor is configured to execute the instructions to receive a first signal via the communications unit. The first signal may include first information characterizing an exchange of data initiated at a client device, and based on the first information, the at least one processor is further configured to identify a data type available for use in the data exchange. The at least one processor is also configured to receive, via the communications unit, a second signal comprising a digital token representative of the data type, and generate and transmit a third signal to the client device via the communications unit. The third signal may include the digital token and data that instructs the client device to display, based on the digital token, second information characterizing the data type on an interface.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIGS. 2, 3A-3D and 4A-4C are diagrams illustrating portions of an exemplary computing environment, consistent with the disclosed embodiments.

DETAILED DESCRIPTION

Figure 1:
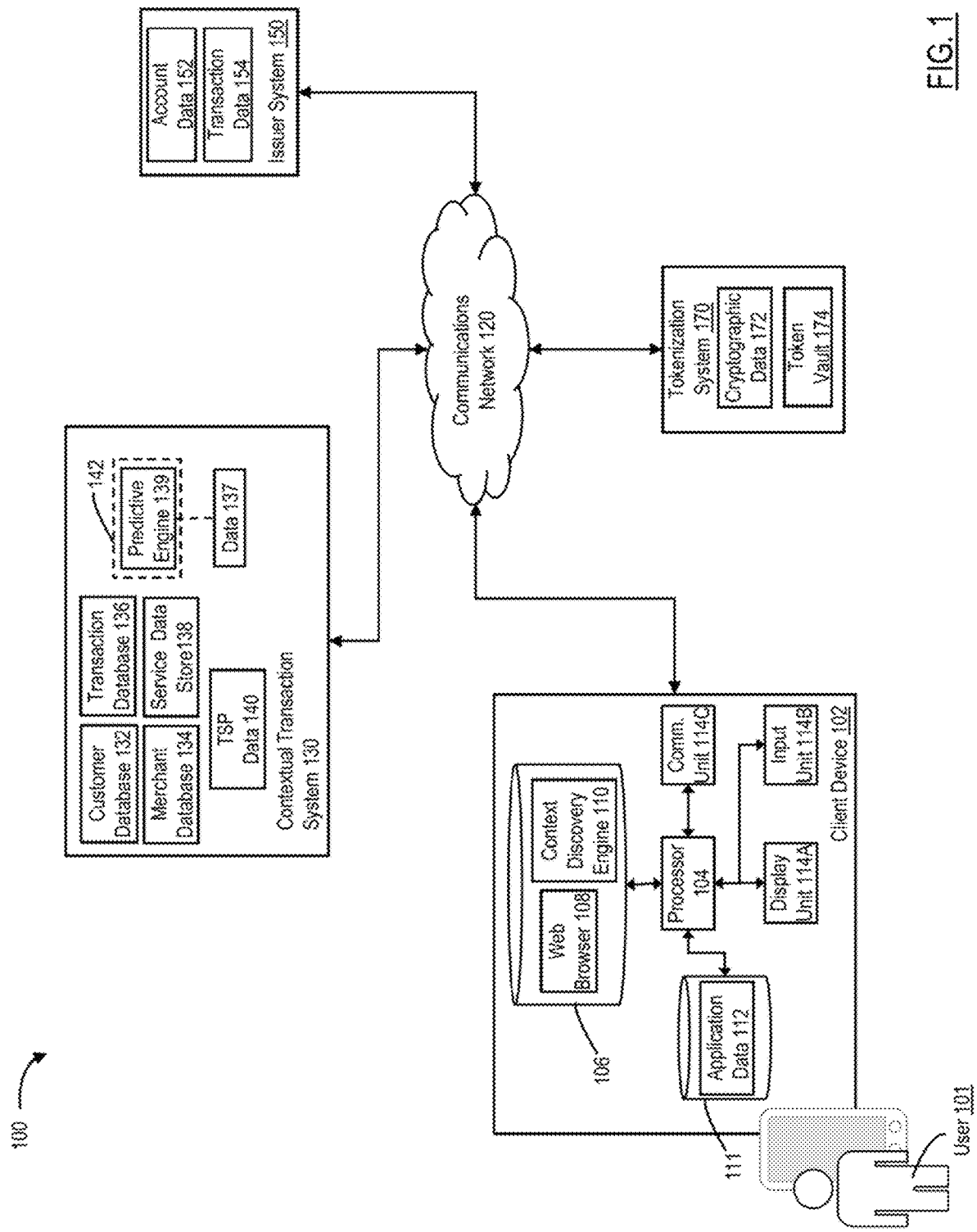
FIG. 1 is a diagram of an exemplary computing environment, consistent with the disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

I. Exemplary Computing Environments

FIG. 1 is a diagram illustrating an exemplary computing environment 100, consistent with certain disclosed embodiments. As illustrated in FIG. 1, environment 100 may include a client device 102, a context discovery system 130, an issuer system 150, and a tokenization system 170, each of which may be interconnected through any appropriate combination of communications networks, such as network 120.

Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems operating within environment 100 may perform operations that establish and maintain one or more secure channels of communication across network 120, such as, but not limited to, a transport layer security (TSL) channel, a secure socket layer (SSL) channel, or any other suitable secure communication channel.

In an exemplary embodiment, client device 102 may include a computing device having one or more tangible, non-transitory memories that store data and/or software instructions, and one or more processors, e.g., processor 104, configured to execute the software instructions. The one or more tangible, non-transitory memories may, in some aspects, store software applications, application modules, and other elements of code executable by the one or more processors, e.g., within application repository 106.

For example, as illustrated in FIG. 1, client device 102 may maintain, within application repository 106, an executable web browser 108 and a context discovery engine 110. In some instances, context discovery engine 110 may be associated with and provisioned to client device 102 by context discovery system 130. As described herein, context discovery engine 110 may perform operations that, in conjunction with web browser 108, access and obtain contextual data characterizing one or more exchanges of data, such as a purchase transaction, initiated by corresponding counterparties through a web page (or another HTML file or document) accessed and rendered by browser 108. For example, the accessed web page (or the other HTML file or document) may be characterized by a corresponding document object model (DOM), which web browser 108 may obtain and store within a locally accessible memory. Further, and as described herein, executed web browser 108 may access and parse the stored DOM when rendering the accessed web page (or other HTML file or document) for presentation within a corresponding interface.

In one example, context discovery engine 110 may include one or more mobile applications that, when executed by processor 104, access elements of browser-specific data generated and locally maintained by web browser 108. For instance, web browser 108 may be compatible with one or more standards and protocols established by the World Wide Web Consortium™ (W3C™), and context discovery engine 110 may include a W3C™-compatible mobile application, such as a W3C™-compatible payment application, configured to identify and access one or more elements of the browser-specific data, or to interact with one or more elements of JavaScript™ executed by web browser 108 (e.g., that facilitate access to the browser-specific data), through a corresponding programmatic interface or API.

In other examples, context discovery engine 110 may include one or more browser extensions or "add-ons" that, when executed by web browser 108, extend or modify one or more functionalities of web browser 108, such as, but not limited to, a capability to identify and access elements of the browser-specific data generated by executed web browser 108. Additionally, or alternatively, context discovery engine 110 may include one or more elements of executable code or instructions, such as elements of JavaScript™, that, when executed by web browser 108, cause web browser 108 to not only identify and access elements of the browser-specific data, but also to perform one or more operations on or associated with the elements of browser-specific data. For example, context discovery engine 110 may include elements of JavaScript™ that, upon execution, access particular elements of the browser-specific data, and redirect these elements of browser-specific data to an additional website associated with context discovery system 130 (e.g., through a hypertext transfer protocol (HTTP) redirect process).

By way of example, the elements of browser-specific data may include data characterizing one or more document object models (DOMs) associated with web pages, HTML files or documents, or other files accessed and rendered for presentation by web browser 108. In some instances, context discovery engine 110 may perform any of the exemplary processes described herein to parse the data characterizing the DOM associated with an accessed and rendered web page to identify, and extract, contextual data that characterizes an exchange of data initiated through the web page. Further, and as described herein, context discovery engine 110 may perform form operations that cause client device 102 to transmit portions of the contextual data across network 120 to one or more network-connected computing systems, such as context discovery system 130.

The disclosed embodiments are, however, not limited to these examples of context discovery engine 110, and to these exemplary operations performed on data characterizing the one or more DOMs associated with the web pages, HTML files, or other documents accessed and rendered by web browser 108. In other instances, context discovery engine 110 may include any additional or alternate executable applications, browser extensions, or elements of module of executable code that, when executed by processor 104 (or by web browser 108), access, extract, and perform operations on any additional or alternate elements of locally maintained browser-specific data that characterizes web pages, HTML files, or other documents rendered for presentation by web browser 108.

Referring back to FIG. 1, client device 102 may also establish and maintain, within the one or more tangible, non-tangible memories, one or more structured or unstructured data repositories or databases, e.g., data repository 111, that include application data 112. Application data 112 may include information that facilitates a performance of operations by the one or more executable application programs maintained within application repository 106, e.g., web browser 108 or context discovery engine 110. For example, application data 112 may include data associated with or generated by web browser 108, such as, but not limited to, data characterizing one or more document object models (DOMs) of web pages, HTML files, or other documents accessed and rendered for presentation by web browser 108. Further, in some instances, application data 112 may also include one or more authentication credentials that enable user 101 to access context discovery system 130, such as, but not limited to, an alphanumeric user name or login credential, an alphanumeric password, or a biometric authentication credential (e.g., a digital image of user 101's face, a fingerprint scan, etc.).

Further, in some instances, client device 102 may also include a display unit 114A configured to present interface elements to user 101, and an input unit 114B configured to receive input from user 101. By way of example, display unit 114A may include, but is not limited to, an LCD display unit or other appropriate type of display unit, and input unit 114B may include, but input not limited to, a keypad, keyboard, touchscreen, voice activated control technologies, or appropriate type of input unit. Further, in additional aspects (not depicted in FIG. 1), the functionalities of display unit 114A and input unit 114B may be combined into a single device, e.g., a pressure-sensitive touchscreen display unit that presents interface elements and receives input from user 101. Client device 102 may also include a communications unit 114C, such as a wireless transceiver device, coupled to processor 104 and configured by processor 104 to establish and maintain communications with network 120 using any of the communications protocols described herein.

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

Referring back to FIG. 1, context discovery system 130, issuer system 150, and tokenization system 170 may each represent a computing system that includes one or more servers (e.g., not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments, including operations consistent with the exemplary transaction preauthorization processes described herein.

In other instances, and consistent with the disclosed embodiments, one or more of context discovery system 130, issuer system 150, and tokenization system 170 may correspond to a distributed system that includes computing components distributed across one or more networks, such as network 120, or other networks, such as those provided or maintained by cloud-service providers. Additionally, in some instances, subsets of context discovery system 130, issuer system 150, and tokenization system 170 can be incorporated into a single computing system, or may be incorporated into multiple computing systems.

In some instances, context discovery system 130 may be associated with, or may perform operations in support of, one or more application programs, extensions, or code elements executed by client devices operating within environment 100, such as, but not limited to, context discovery engine 110 executed by client device 102, either alone or in conjunction with web browser 108. To facilitate a performance of the exemplary processes described herein, contextual transaction system 130 may maintain, within one or more tangible non-transitory memories, a customer database 132, a merchant database 134, a transaction database 136, and a service data store 138.

By way of example, customer database 132 may include data records that identify and characterize users of the one or more native application programs associated with, or supported by, context discovery system 130, such as context discovery engine 110 executed by client device 102, either alone or in conjunction with web browser 108. In some instances, the data records of customer database 132 may include, for each of the users, one or more authentication credentials that enable corresponding ones of the users to access a web page or digital portal associated with context discovery system 130. The one or more authentication credentials may be selected by each of the corresponding users, or assigned to each of the corresponding users by context discovery system 130, during an initial registration process, and examples of the authentication credentials include, but are not limited to, an alphanumeric user name or login credential, an alphanumeric password, a biometric authentication credential (e.g., a fingerprint scan, a digital image of a user's face, etc.), or any combination thereof.

Further, in some instances, the data records of customer database 132 may also maintain elements of profile data that characterize each of the users of context discovery engine 110. By way of example, the elements of profile data characterizing the users of context discovery engine 110 may include, but are not limited to, a full name of each of the users, a mailing address for each of the user, and a value of one or more demographic parameters of each of the users, such as, but not limited to, an age, a gender, an occupation, an educational level, or an income level. The elements of profile data may also include payment data that characterizes one or more payment instruments held by each of the users of context discovery engine 110 and in some instances, additional data characterizing one of more rewards or loyalty programs in which users of context discovery engine 110 participate.

For example, the payment data maintained on behalf of a corresponding one of the users, such as user 101, may include an identifier of one or more payment instruments held by user 101 (e.g., a Visa™ credit card and an American Express™ credit card), along with tokenized account data associated with each of the one or more payment instruments. Further, the additional data characterizing one of more rewards or loyalty programs for a corresponding one of the users, such as user 101, may include an identifier of each of the one or more rewards or loyalty programs and an entity that provides or supports each of the one or more rewards or loyalty programs (e.g., a uniform resource locator (URL) of a web page associated with corresponding ones of the provisioning or supporting entity), along with information that characterizes a current status of each of the loyalty or rewards programs (e.g., a current balance of accrued "points") and a scheme by which user 101 accrues points within each of the loyalty or rewards programs. In some instances, context discovery system 130 may obtain portions of the data characterizing one or more of the loyalty or rewards programs through the initiation registration processes described herein, and additionally or alternatively, from network connected computing systems operated the provisioning or supporting entities, e.g., through an appropriate push or pull operation (not illustrated in FIG. 1).

In further instances, the data records of customer database 132 may also maintain, for one or more of the users of context discovery engine 110, preference data that identifies corresponding user-specified preferences for the available payment instruments described herein, e.g., as identified and characterized by corresponding portions of the payment data. By way of example, and for a corresponding one of the users, such as user 101, the preference data may identify a preference of user 101 to fund purchase transactions using a particular one of the payment instructed characterized by the payment data described herein. Additionally, or alternately, the preference data may associate a particular payment instrument with purchase transactions characterized by specified parameter values (e.g., a specified transaction value, or a specified ranges of transaction values), with purchase transactions involving specified products or types of products, with purchase transactions involving a specific counterparty or a specified type of counterparty (e.g., a specified merchant, a merchant characterized by a specified merchant category code), or any combination thereof.

Referring back to FIG. 1, merchant database 134 may include data records that identify and characterize one or more merchants, or groups of merchants, that offer products or services for sale to corresponding customers, such as user 101. For example, the data records of merchant database 134 may include information that identifies each of the one or more merchants (e.g., an assigned merchant name or a merchant classification code (MCC)), along with a discrete geographic positions associated with the one or more merchants, such as, but not limited to, a street address, one or more geophysical coordinates that characterize the discrete geographic positions (e.g., a latitude, longitude, and/or altitude, etc.). Further, and in additional examples, the data records of merchant database 134 may also associate one or more of the merchants with corresponding products or services, or types of products or services (e.g., as specified by corresponding universal product codes (UPCs) or other identifiers).

Transaction database 136 may include data records that identify and characterize prior exchanges of data initiated by corresponding devices and authorized in accordance with any of the exemplary processes described herein. In some examples, one or more of the prior data exchanges may correspond to a prior purchase transaction initiated by user 101 or by a corresponding client device, such as client device 102, at a physical or electronic point-of-sale (POS) terminal operated by a corresponding merchant. In other examples, one or more of the prior data exchanges may include a prior financial services transaction initiated by user 101 at a terminal device disposed at a physical location of a financial institution (e.g., an automated teller machine (ATM), a representative's terminal device, etc.), or a prior financial services transaction initiated between client device 102 and a computing system operated by the financial institution, such as issuer system 150. Examples of these prior financial transactions include, but are not limited to, a withdrawal from, or a deposit into, a corresponding financial services account (e.g., a checking account, savings account, etc.), an initiation of a scheduled payment for a loan, line or credit, or credit card account, or an electronic transfer of funds from a source to a destination account.

In some instances, and for each of the prior purchase and financial services transactions, the data records of transaction database 136 may include, but are not limited to, data identifying a corresponding transaction type (e.g., the purchase or financial services transaction). The data records of transaction database 136 may also include data identifying a user or a device that initiated the prior transaction (e.g., a user identifier, such as an alphanumeric character string assigned to user 101, or a device identifier, such as an IP or a MAC address assigned to client device 102), and counterparty data identifying a corresponding counterparty to each of the prior transactions (e.g., an IP or MAC address assigned to the corresponding POS terminal or terminal device, a URL or IP address assigned to the digital POS terminal or computing system, an identifier or geographic position of the counterparty, etc.).

Further, the data records of transaction database 136 may also include values of transaction parameters that characterize each of the prior transactions, such as, but not limited to, a transaction date or time, a transaction value, a payment instrument or financial services account involved in the prior transactions (e.g., an account identifier, tokenized account data, etc.), or an identifier of a product or service involved in the prior purchase transactions, e.g., an assigned Universal Product Code (UPC). The disclosed embodiments are, however, not limited to these examples of prior transaction information, and in other instances, transaction database 136 may include any additional or alternate information capable of identifying and characterizing one or more of the prior purchase and financial services transactions.

In some examples, contextual transaction system 130 may receive information that identifies and characterizes the one or more prior purchase and financial transactions from one or more computing systems operated by the financial institution or from the counterparties, or from the one or more terminal devices involved in the prior purchase or financial services transactions (e.g., across network 120 through a corresponding programmatic interface), and may perform operations that store the received information within corresponding portions of the data records of transaction database 136. In one instance, contextual transaction system 130 may receive portions of the information from the computing systems or the terminal devices at regular or predetermined intervals or in response to a detection of a corresponding triggering event (e.g., as a "push" operation), and additionally, or alternatively, in response to a programmatically generated and transmitted request (e.g., as a "pull" operation).

Service data store 138 may include information that identifies and characterizes one or more services available for provisioning to client device 102, and to user 101, during a current browser session established by client device 102. For example, client device 102 may execute a web browser, such as web browser 108, and user 101 may provide input to client device 102 (e.g., via input unit 114B) that causes executed web browser 108 to access and render for presentation one or more web pages or HTML document, which collectively establish a current browser session on client device 102. Further, and as described herein, context discovery engine 110, as executed by client device 102, may perform any of the exemplary processes described to intercept and transmit, to context discovery system 130, contextual data characterizing one or more potential purchase transactions initiated during the current browser session. In some instances, one or more of the available services may be associated with the potential purchase transactions initiated by user 101 during the current browser session, and further, associated with and linked to certain elements of the intercepted contextual data that characterizes the potential purchase transactions.

In some examples, service data store 138 may maintain, for each of the available services, a unique service identifier (e.g., an alphanumeric service name, etc.) along with additional data (e.g., metadata) that characterizes the service (e.g., a description of the available service). Service data store 138 may also link each of the unique service identifiers with corresponding triggering criteria that, when exhibited by the initiated purchase transaction or by user 101, triggering a provision of a corresponding one of the available services to client device 102 using any of the exemplary processes described herein. For example, the triggering criteria may identify, for a corresponding one of the available services, corresponding elements of contextual data that characterizes a potential purchase transaction (e.g., identifiers of purchased products or services or classes of products or services, a transaction amount, an amount of applied tax, shipping data, etc.), demographic data characterizing user 101 (e.g., an age, an income, a place of residence or mailing address, etc.), or counterparty data characterizing a counterparty to the potential purchase transaction (e.g., a merchant name, data characterizing a merchant class, such as an assigned MCC, a merchant URL, etc.).

Service data store 138 may also maintain, for each of the available services, corresponding elements of layout data that, when provisioned to client device 102 (e.g., via context discovery engine 110) and rendered for presentation by executed web browser 108, identify and characterize each of the available services and, in some instances, prompt user 101 to enter additional information (via input unit 114B) that facilitates a perform of the available services. Examples of the layout data include, but are not limited to, portions of HTML files, files that include other markup languages, or elements of executable code or script, such as JavaScript™ embedded within the HTML files. Additionally, or alternatively, service data store 138 may maintain one or more applications, application modules, and other elements of code that, when executed by context discovery system 130, cause context discovery system 130 to perform operations in support of corresponding ones of the available services. In some examples, service data store 138 may associate or link each of the elements of layout data, and the one or more applications, application modules, or other elements of code, to a corresponding one of the unique service identifiers.

Context discovery system 130 may also maintain, within the one or more tangible, non-transitory memories, tokenization service provider (TSP) data 140 that identifies one or more computing systems configured to perform tokenization services on behalf of context discovery system 130. For example, TSP data 140 may include, but is not limited to, a unique network address of tokenization system 170, such as an assigned IP address or a MAC address.

Further, as illustrated in FIG. 1, context discovery system 130 may also maintain, within the one or more tangible, non-transitory memories, one or more executable application programs 142, such as a predictive engine 139. When executed by context discovery system 130, predictive engine 139 may perform any of the exemplary processes described herein to identify one or more data types available for use in an exchange of data initiated during a current browser session established by executed web browser 108 based on contextual data intercepted by context discovery engine 110 during the current browser session.

In one example, executed predictive engine 139 may identify, and characterize, the one or more available data types based on the intercepted contextual data and corresponding portions of customer database 132, such as, but not limited to, elements of the exemplary profile data, the exemplary preference data, or the exemplary data characterizing one or more loyalty or rewards programs, as described herein. In other examples, executed predictive engine 139 may identify the one or more available data types to portions of the intercepted contextual data and portions of transaction database 136. Further, and as illustrated in FIG. 1, contextual transaction system 130 may maintain, within the one or more tangible, non-transitory memories, predictive engine data 137 that supports the execution of, or the training and adaptive improvement of, one or more of the machine learning algorithms or adaptive processes described herein.

Referring back to FIG. 1, issuer system 150 may be associated with, or operated by, a financial institution that issues one or more payment instruments to one or more users of context discovery system 130 (e.g., a credit card account, debit card account, deposit account, etc., issued by the financial institution and held by user 101). Issuer system 150 may also maintain customer account data 152 that identifies underlying accounts (e.g., account numbers, expiration dates, card verification values, etc.) associated with each of the payment instruments issued by issuer system 150, transaction data 154 that identifies and characterizes one or more data exchanges authorized by issuer system 150 using any of the exemplary authorization processes described herein. Examples of these authorized data exchanges include, but are not limited to, authorized purchase transactions initiated by client device 102 (or user 101) at a physical or digital point-of-sale (POS) terminal operated by a corresponding counterparty, or an authorized financial services transaction initiated by As described herein, tokenization system 170 may, upon execution of stored software instructions, perform operations that provide tokenization services to context discovery system 130 and additionally, or alternatively, to issuer system 150. To facilitate the provision of these exemplary tokenization services, tokenization system 170 may maintain, within on or more tangible non-transitory memories, cryptographic data 172 and a token vault 174. Cryptographic data 172 may, in some instances, include information that facilitates a generation, by tokenization system 170, of tokenized data (e.g., a digital token) representative of a payment instrument held by one or more users of context discovery system 130, such as user 101. Further, token vault 174 may include data records that include the tokenized data, e.g., such as the generated digital tokens described herein.

II. Exemplary Computer-Implemented Processes for Provisioning Digital Tokens to Network-Connected Devices Based on Intercepted Contextual Data Generated During a Browser Session As described herein, a client device operating within environment 100, such as client device 102, may execute a web browser, such as web browser 108, maintained within one or more tangible, non-transitory memories, e.g., within application repository 106. For example, client device 102 may execute a web browser, such as web browser 108, and user 101 may provide input to client device 102 (e.g., via input unit 114B) that causes executed web browser 108 to access and render for presentation one or more web pages, which collectively establish a current browser session on client device 102.

For example, the one or more accessed web page may each be associated with data characterizing a corresponding document object model (DOM), which web browser 108 may obtain and store within a locally accessible memory. Further, and as described herein, web browser 108 may access and parse the stored data characterizing corresponding ones of the DOMs when rendering the accessed web pages for presentation within a corresponding interface, such as a browsing window displayed on a corresponding display unit, such as display unit 114A.

In some instances, at certain points during the current browser session, user 101 may provide additional input to client device 102 that initiates an exchange of data with one or more potential counterparties, e.g., via input unit 114B.

The potential counterparties may, for example, be associated with the one or more accessed and rendered web pages, and the provided input may collectively establish and describe a context of the initiated data exchange. Further, and as described herein, web browser 108 may generate and present additional interface elements representative of the provided input within the corresponding interface, and may perform operations that access and modify portions of the stored data characterizing corresponding ones of the DOMs in accordance with the provided input.

Prior to executing the initiated data exchange, an additional application program executed by client device 102, such as context discovery engine 110 may perform any of the exemplary processes described herein, either alone or in conjunction with web browser 108, to interrupt the current browser session and intercept contextual data that characterizes the initiated data exchange, e.g., based on portions of the modified data characterizing the DOMs of the accessed web pages. In some examples, as described herein, context discovery engine 110 may perform operations that cause client device 102 to transmit portions of the intercepted contextual data across network 120 to context discovery system 130, e.g., across a secure programmatic communications channel.

Context discovery system 130 may receive the transmitted contextual data, and in some examples, may perform any of the exemplary processes described herein to identify a data type that is available for use in the initiated data exchange and further, that is consistent with portions of transmitted contextual data. Context discovery system 130 may perform additional operations that, either alone or in conjunction with one or more computing systems, obtain tokenized data representative of the available data type, such as, but not limited to, a digital token.

In some instances, context discovery system 130 may transmit the digital token across network 120 to client device 102, e.g., through a secure, programmatic channel of communication, and context discovery engine 110 may perform any of the exemplary processes described herein to parse the digital token to extract data characterizing the available data type, and to populate certain elements or fields of the presented web pages with portions of the extracted data. Further, and in response to the population of the presented web pages with the extracted data, context discovery engine 110 may perform additional operations that request an execution of the initiated data exchange in accordance with the extracted contextual data and the available data type, and without additional input from user 101.

In further instances, and as described herein, context discovery system 130 may also perform operations that access locally maintained data characterizing services available for provisioning to client device 102 (e.g., within service data store 138), and identify one or more of the available services that are consistent with corresponding portions of the transmitted contextual data. Context discovery system 130 may extract, from service data store 138, information that identifies and characterizes the identified available services (e.g., portions of the layout data described herein), and may transmit the extract service information across network 120 to client device 102, e.g., across a secure, programmatic channel of communications.

When executed by client device 102, context discovery engine 110 may, in conjunction with executed web browser 108, may perform any of the exemplary processes described herein to render portions of the extracted service information for presentation within the corresponding interface. In further instances, context discovery engine 110 may perform additional operations that, in conjunction with web browser 108, automatically delay the execution of the initiated data exchange during a corresponding temporal interval, which enables user 101 to provide additional input to client device 102 that facilitates the performance of the identified available services.

In some examples, the initiated data exchange corresponds to a purchase transaction, which client device 102 may initiate with a corresponding counterparty based in input data provided by user 101 to executed web browser 108 during the current browser session. For example, user 101 may elect to purchase two tickets to a Washington Capitals™ hockey on Apr. 19, 2018, and user 101 may provide input data to executed web browser 108 that specifies a URL of a ticket reseller, such as a website operated StubHub™. In response to the provided input, executed web browser 108 may access one or more web page associated with the StubHub™ website, obtain data characterizing a document object model (DOM) of the accessed web pages, and store the obtained DOM data within a portion of a tangible, non-transitory memory, e.g., within a portion of application data 112. Further, web browser 108 may perform any of the operations described herein to parse obtained DOM data and render the accessed web pages within a corresponding interface, e.g., a browser window displayed on display unit 114A.

Figure 2:
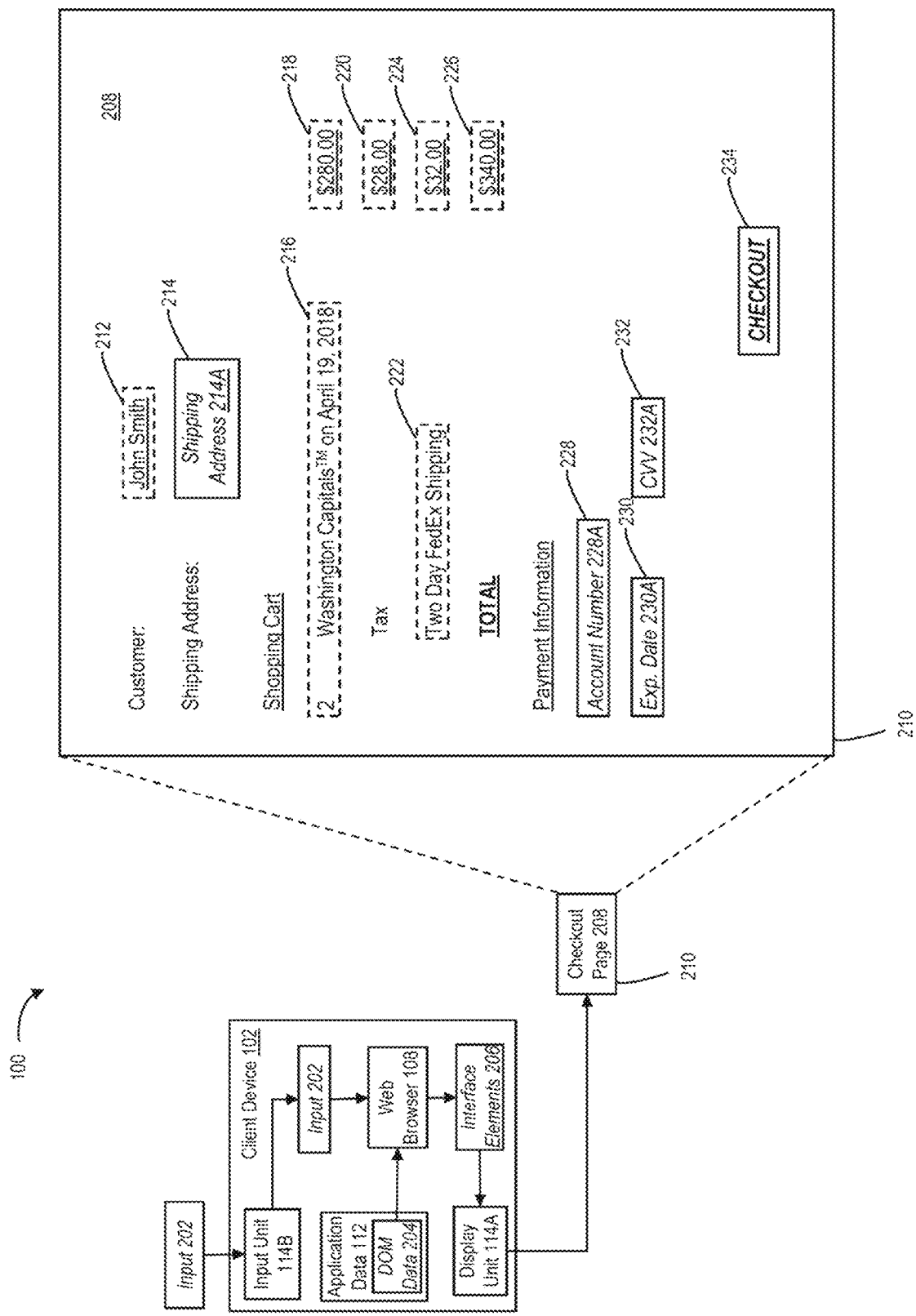

Referring to FIG. 2, and based on the presented web pages, user 101 may provide additional input data 202 to client device 102 that requests a purchase of two Washington Capitals™ for the April 19 hockey match for a list price of $280.00. For instance, user 101 may provide portions of input data 202 in response to certain input fields within the one or more viewed web pages, and input data 202 may include, but is not limited to, a name of user 101 (e.g., "John Smith"), information identifying and characterizing the purchase tickets (e.g., tickets located at section 110, row M, and seats 3 and 4 for the April 19 Washington Capitals™ hockey game), information identifying a selected delivery or shipping mode (e.g., delivery via FedEx™).

In some examples, input unit 114B of client device 102 may receive and route additional input data 202 to executed web browser 108, which may perform operations that access DOM data 204 associated with the accessed and rendered web pages (e.g., as maintained within application data 112), and modify portions of accessed DOM data 204 to reflect input data 202. Web browser 108 may perform additional operations that process input data 202 and render additional input data 202 for presentation within corresponding portions of an additional web page associated with the StubHub™ website, such as a checkout page 208 presented within browser window 210. For instance, web browser 108 may perform operations that generate one or more interface elements 206 representative of portions of input data 202, and that route generated interface elements 206 to display unit 114A, which may present interface elements at corresponding positions within presented checkout page 208.

For example, as illustrated in FIG. 2, browser window 210, which displays rendered checkout page 208 of the StubHub™ website, may include, but is not limited to, interface element 212, which identifies user 101 (e.g., "John Smith"), and interface elements 214, which establishes an input field 214A into which user 101 may input a shipping address. Browser window 210 may also include interface elements 216, which identify the purchase of the two tickets for the Washington Capitals™ hockey match on Apr. 19, 2018, interface element 218, which identifies the $280.00 value of the purchase tickets, and interface element 220, which identifies the $28.00 in local sales tax associated with the purchased tickets.

In some instances, browser window 110 may also include interface elements 222, which identify a selected shipping provider or mechanism (e.g., two-day delivery by FedEx™), and interface element 224, which identifies a cost associated with the selected shipping provider or mechanism (e.g., $32.00). Further, browser window 210 may include interface element 226, which specifies the $340.00 total value of the initiated purchase transaction involving the two tickets for the Washington Capitals™ hockey match on Apr. 19, 2018.

Browser window 210 may also include additional interface elements that establish one or more input fields capable of receiving additional, or alternate, input data characterizing a payment instrument selected to fund the initiated purchase transaction. For instance, browser window 210 may include interface element 228, which establishes an input field 228A corresponding to an account number of the selected payment instrument, interface element 230, which establishes an input field 230A corresponding to an expiration date of the selected payment instrument, and interface element 232, which establishes an input field 232A corresponding to a verification code of the selected payment instrument. Additionally, in some examples, browser window 210 may also include interface elements 234, which collectively establish an icon (e.g., a "CHECKOUT" icon) that, when selected by user 101, causes client device 102 to perform operations that execute the initiated purchase transaction in accordance with the account data characterizing the selected payment instrument.

In one example, user 101 may provide further input to client device 102, e.g., via input unit 114B, that specifies the shipping address (e.g., in response to presented input field 214A) and additionally, or alternatively, the account data characterizing the selected payment instrument (e.g., in response to presented input fields 228A, 230A, and 232A). The further input may also characterize a selection of the "CHECKOUT" icon represented by interface elements 234. Responsive to the further input provided by user 101, and to the selection of the "CHECKOUT" icon, client device 102 may perform operations that execute the initiated purchase transaction based on the specific account data and in accordance with one or more appropriate payment protocols, e.g., an EMV payment protocol.

In some instances, however, the provisioning of the further input, which specifies at least the account number, the expiration date, and the verification code of the selected payment instrument, may expose user 101 to fraudulent activity, as a malicious third party may physically observe user 101 providing the account data to input unit 114B, or alternatively, the malicious third party may access a browser cache or other stored data characterizing the checkout page of the StubHub™ website. In other instances, client device 102 may correspond to a computing device characterized by a limited input or interface functionality, e.g., a smart watch or a wearable computing device, and an accurate provisioning of at least the sixteen-digit account number, the four-digit account number, and the three- or four-digital verification code into the limited-functionality device may be difficult, if not impossible.

In other examples, client device 102 may perform any of the exemplary processes described herein to obtain data characterizing a context of the initiated purchase transaction, and to transmit portions of the contained contextual data across a secure, programmatic communications channel to one or more network-connected computing systems, such as context discovery system 130 of FIG. 1. As described herein, context discovery system 130 may receive the transmitted contextual data and perform additional operations that identify a payment instrument consistent with one or more preferences or user 101 and additionally, or alternatively, with one or more prior purchase or financial services transactions initiated by user 101 or client device 102 (or by other users of context discovery system 130).

Context discovery system 130 may, for example, obtain and transmit tokenized data representative of the identified payment instrument, such as, but not limited to, a digital payment token, to client device 102 across the secure, programmatic communications channel. The digital payment token may, in some instances, include tokenized account data associated with the identified payment instrument (e.g., a tokenized account number, expiration date, or verification code), and client device 102 may perform any of the exemplary processes described herein to populate, without input from user 101, the corresponding input fields within checkout page 208 of the StubHub™ website (e.g., input fields 228A, 230A, and 232A within browser window 210) with corresponding elements of the tokenized account data maintained within the digital payment token. Additionally, or alternatively, the digital payment token may also include information identifying the shipping address of user 101 (e.g., a billing address associated with the tokenized account data, etc.), and client device 102 may perform any of the exemplary processes described herein to populate, without input from user 101, input field 214A within checkout page 208 of the StubHub™ website with the shipping address. In some instances, described herein, client device 102 may perform additional operations that execute automatically the initiated purchase transaction based on the tokenized account data, in accordance with one or more appropriate payment protocols, e.g., an EMV payment protocol, and further, without additional input from user 101.

By way of example, client device 102 may maintain, within application repository 106, context discovery engine 110 that is associated with and provisioned to client device 102 by context discovery system 130. As described below in reference to FIGS. 3A-3D, context discovery engine 110 may perform operations that, in conjunction with web browser 108, access and obtain contextual data characterizing the initiated purchase transaction (e.g., the $340 purchase of the tickets to the Washington Capitals™ hockey match on April 19) from presented checkout page 208 of the StubHub™ website, and that route the obtained contextual data across network 120 to context discovery system 130, e.g., through a corresponding programmatic interface.

Referring to FIG. 3A, context discovery engine 110 may include a mobile application 302 that, when executed by processor 104, access elements of browser-specific data generated and locally maintained by web browser 108, e.g., within application data 112. For example, when executed by client device 102, web browser 108 may generate one or more electronic comments that trigger an execution of mobile application 302 by client device 102. In some instances, executed mobile application 302 may perform operations that monitor interface elements generated by web browser 108 (e.g., through a corresponding programmatic interface, such as a browser-specific application programming interface (API)) to detect a rendering and presentation of a particular web page, or particular web pages, associated with an initiated purchase transaction, such as the initiated $340.00 purchase of the tickets to the Washington Capitals™ hockey match on Apr. 19, 2018, from the StubHub™ website.

For example, the particular web page associated with the initiated purchase transaction may include, but is not limited to, checkout page 208 of the StubHub™ website. In response to the detected rendering and presentation of checkout page 208 within browser window 210, mobile application 302 may perform operations that access, through the corresponding web-browser API (not illustrated in FIG. 3A), elements of browser-specific data generated and maintained by web browser 108 within portions of application data 112. For example, the accessed elements of browser-specific data may characterize a page structure of presented checkout page 208, and may include, but is not limited to, DOM data 204, which characterizes the document object model (DOM) associated with checkout page 208.

In some instances, mobile application 302 may extract portions of contextual data 304 from DOM data 204, e.g., via the corresponding browser-specific API, and contextual data 304 may identify and characterize the initiated purchase transaction (e.g., the initiated $340.00 purchase of the tickets to the Washington Capitals™ hockey match on Apr. 19, 2018) and additionally, or alternatively, the initiating customer (e.g., user 101 that operates client device 102) and the counterparty (e.g., the StubHub™ website). By way of example, contextual data 304 may include, but is not limited to, an identifier of each of the purchase products or services (e.g., a UPC code assigned to each of the purchased tickets, etc.), a value of the purchased product or service (e.g., the $280 face value of the purchased tickets), a value of a local tax applied to the purchase transaction (e.g., the $28.00 in sales tax), a selected shipping provider or mechanism (e.g., two-day delivery by FedEx™), a cost associated with the selected shipping provider or mechanism (e.g., $32.00), or a total transaction value of the purchase transaction (e.g., $340.00).

In further examples, contextual data 304 may also include an identifier of user 101 (e.g., a name, such as "John Smith"), and information characterizing the counterparty, such as, but not limited to, a counterparty name (e.g., StubHub™) or a URL maintained by the counterparty (e.g., a URL of the StubHub™ website). Additionally, or alternatively, contextual data 304 may also include a URL of a payment processes associated with the counterparty. The disclosed embodiments are, however not limited to these examples of contextual data, and in other examples, contextual data 304 may include any additional or alternate information that characterizes the initiated purchase transaction, the counterparty, or user 101.

Referring back to FIG. 3A, mobile application 302 may perform operations that identify and extract, from application data 112, additional information that species one or more authentication credentials assigned to user 101, e.g., local authentication data 306. The one or more authentication credentials may, for example, enable user 101 to access a web page or digital portal associated with or provided by context discovery system 130, the one or more authentication credentials may be assigned to user 101, or selected by user 101, based on data exchanged between client device 102 and context discovery system 130 during an initial registration process. In some instances, local authentication data 306 may include, but is not limited to, an alphanumeric user name or login credential, an alphanumeric password, or one or more biometric credentials captured by client device 102 during the initial registration process, such as a scanned fingerprint of user 101 or a captured digital image of a portion of user 101's face. In some instances, mobile application 302 may generate output data 308 that includes portions of contextual data 304 or local authentication data 306.

In other examples, described herein, context discovery engine 110 may include one or more browser extensions or "add-ons" that, when executed by web browser 108, extend or modify one or more functionalities of web browser 108. Referring to FIG. 3B, context discovery engine 110 may include a browser extension 312 that, when executed programmatically by web browser 108, access elements of browser-specific data generated and locally maintained by web browser 108, e.g., within application data 112. Upon execution by client device 102, web browser 108 may generate one or electronic commands that trigger an execution of browser extension 312, which may perform operations that monitor interface elements generated by web browser 108 to detect a rendering and presentation of a particular web page, or particular web pages, associated with an initiated purchase transaction, such as the initiated $340.00 purchase of the tickets to the Washington Capitals™ hockey match on Apr. 19, 2018, from the StubHub™ website.

As described herein, the particular web page associated with the initiated purchase transaction may include, but is not limited to, checkout page 208 of the StubHub™ website. In response to the detected rendering and presentation of checkout page 208 within browser window 210, browser extension 312 may perform operations that access elements of browser-specific data generated and maintained by web browser 108 within portions of application data 112, e.g., through a secure, programmatic interface, such as a browser-specific API (not illustrated in FIG. 3B). For example, the accessed elements of browser-specific data may identify and characterize a page structure of presented checkout page 208, and may include, but is not limited to, DOM data 204, which characterizes the document object model (DOM) associated with checkout page 208.

For example, as illustrated in FIG. 3B, browser extension 312 may extract portions of contextual data 314 from DOM data 204. In some instances, contextual data 314 may identify and characterize the initiated purchase transaction (e.g., the initiated $340.00 purchase of the tickets to the Washington Capitals™ hockey match on Apr. 19, 2018) and additionally, or alternatively, the initiating customer (e.g., user 101 that operates client device 102) and the counterparty (e.g., the StubHub™ website). As described herein, examples of contextual data 314 include, but are not limited to, the identifier of each of the purchased products or services, the value of the purchased product or service, the value of the applied local tax applied to the purchase transaction, the selected shipping provider or mechanism, the shipping address, the shipping cost, or the total transaction value of the purchase transaction. Contextual data 314 may also include any of the exemplary identifiers or user 101, the counterparty, or the counterparty payment processor, as described herein.

Referring back to FIG. 3B, browser extension 312 may perform operations that identify and extract, from application data 112 through the browser-specific API, additional information that species one or more authentication credentials assigned to user 101, e.g., local authentication data 316. Examples of local authentication data 306 include, but are not limited to, an alphanumeric user name or login credential, an alphanumeric password, or one or more biometric credentials captured by client device 102 during the initial registration process, such as a scanned fingerprint of user 101 or a captured digital image of a portion of user 101's face. In some instances, as described herein, browser extension 312 may generate output data 318 that portions of contextual data 314 or local authentication data 316.

Additionally, in some examples, context discovery engine 110 may also include one or more elements of executable code or instructions that, when executed by web browser 108, cause web browser 108 to not only identify and access elements of the browser-specific data, but also to perform one or more operations on or associated with the elements of browser-specific data. Referring to FIG. 3C, context discovery engine 110 may include one or more elements 322 of JavaScript™ associated with, provisioned to client device 102 by, context discovery system 130. When executed programmatically by web browser 108 (e.g., using corresponding JavaScript™ engine), JavaScript™ elements may perform operations that monitor interface elements generated by web browser 108 to detect a rendering and presentation of a particular web page, or particular web pages, associated with an initiated purchase transaction, such as the initiated $340.00 purchase of the tickets to the Washington Capitals™ hockey match on Apr. 19, 2018, from the StubHub™ website.

As described herein, the particular web page associated with the initiated purchase transaction may include, but is not limited to, checkout page 208 of the StubHub™ website. In response to the detected rendering and presentation of checkout page 208 within browser window 210, JavaScript™ elements 322 may perform operations that access elements of browser-specific data generated and maintained by web browser 108 within portions of application data 112, e.g., through a secure, programmatic interface, such as a browser-specific API (not illustrated in FIG. 3C). For example, the accessed elements of browser-specific data may identify and characterize a page structure of presented checkout page 208, and may include, but are not limited to, DOM data 204, which characterizes the document object model (DOM) associated with checkout page 208.

As illustrated in FIG. 3C, JavaScript™ elements 322 may extract portions of contextual data 324 from DOM data 204, and in some instances, contextual data 324 may identify and characterize the initiated purchase transaction (e.g., the initiated $340.00 purchase of the tickets to the Washington Capitals™ hockey match on Apr. 19, 2018) and additionally, or alternatively, the initiating customer (e.g., user 101 that operates client device 102) and the counterparty (e.g., the StubHub™ website). As described herein, examples of contextual data 324 include, but are not limited to, the identifier of each of the purchased products or services, the value of the purchased product or service, the value of the applied local tax applied to the purchase transaction, the selected shipping provider or mechanism, the shipping cost, or the total transaction value of the purchase transaction. Contextual data 324 may also include any of the exemplary identifiers or user 101, the counterparty, or the counterparty payment processor, as described herein.

Additionally, in some instances, JavaScript™ elements 322 may also perform operations that identify and extract, from application data 112 through the browser-specific API, additional information that species one or more authentication credentials assigned to user 101, e.g., local authentication data 326. Examples of local authentication data 326 include, but are not limited to, an alphanumeric user name or login credential, an alphanumeric password, or one or more biometric credentials captured by client device 102 during the initial registration process, such as a scanned fingerprint of user 101 or a captured digital image of a portion of user 101's face.

As illustrated in FIG. 3C, executed JavaScript™ elements 322 may perform additional operations that cause web browser 108 to redirect portions of contextual data 324 and local authentication data 326 to an additional web page 328 associated with context discovery system 130 (e.g., through a hypertext transfer protocol (HTTP) redirect process). For example, additional web page 328 may correspond to a context discovery web page hosted by context discovery system 130, and additional web page 328 may generate output data 329 that includes portions of contextual data 324 or local authentication data 326.

In other instances, web browser 108 may be compatible with one or more standards and protocols established by the World Wide Web Consortium™ (W3C™). For example, context discovery engine 110 may include a W3C™-compatible mobile application, such as a W3C™-compatible payment application 340 of FIG. 3D, configured to identify and access one or more elements of the browser-specific data, or to interact with one or more elements of JavaScript™ executed by web browser 108 (e.g., that facilitate access to the browser-specific data), through a corresponding programmatic interface or API.

Referring to FIG. 3D, web browser 108 may programmatically execute one or more elements of merchant-specific code or instructions, such as merchant-specific JavaScript™ elements 332, that are capable of exchanging data with a W3C™-compatible programmatic interface established and maintained by web browser 108, such as W3C™ payment request application programming interface (API) 334. In some instances, executed JavaScript™ elements 332 may perform operations that initiate a W3C™-compatible payment request corresponding to the initiated purchase transaction, e.g., $340.00 purchase of the tickets to the Washington Capitals™ hockey match on Apr. 19, 2018, from the StubHub™ website.

To initiate the W3C™-compatible payment request, executed JavaScript™ elements 332, may perform operations that access elements of browser-specific data generated and maintained by web browser 108 within portions of application data 112, e.g., through a secure, programmatic interface, such as a browser-specific API (not illustrated in FIG. 3D). For example, the accessed elements of browser-specific data may identify and characterize a page structure of presented checkout page 208, and may include, but are not limited to, DOM data 204, which characterizes the document object model (DOM) associated with checkout page 208.

As illustrated in FIG. 3D, execute JavaScript™ elements 332 may extract portions of transaction data 336 from DOM data 204, and may perform operations that package transaction data 336 into a corresponding W3C™ payment request 338, which execute JavaScript™ elements 332 may submit to W3C™ payment request API 334. In some instances, transaction data 336 may identify and characterize the purchase transaction (e.g., the initiated $340.00 purchase of the tickets to the Washington Capitals™ hockey match on Apr. 19, 2018) and additionally, or alternatively, the initiating customer (e.g., user 101 that operates client device 102) and the counterparty (e.g., the StubHub™ website), and W3C™ payment request 338 may also include information that identifies a W3C™-compatible payment processer associated with the counterparty, e.g., URL or other identifier of the payment processor.

W3C™ payment request API 334 may receive W3C™ payment request 338, and route W3C™ payment request 338 to W3C™-compatible payment application 340. In some examples, W3C™-compatible payment application 340 may perform operations that interrupt the requested W3C™-compatible payment process, intercept W3C™ payment request 338, and extract, from W3C™ payment request 338, contextual data 342 that characterized the initiated purchase transaction (e.g., the initiated $340.00 purchase of the tickets to the Washington Capitals™ hockey match on Apr. 19, 2018) and the requested W3C™-compatible payment process.

By way of example, contextual data 342 may include, but is not limited to, an identifier of each of the purchase products or services (e.g., a UPC code assigned to each of the purchased tickets, etc.), a value of the purchased product or service (e.g., the $280 face value of the purchased tickets), a value of a local tax applied to the purchase transaction (e.g., the $28.00 in sales tax), a selected shipping provider or mechanism (e.g., two-day delivery by FedEx™), a cost associated with the selected shipping provider or mechanism (e.g., $32.00), or a total transaction value of the purchase transaction (e.g., $340.00). In further instances, contextual data 342 may also include an identifier of user 101 (e.g., a name, such as "John Smith"), and information characterizing the counterparty, such as, but not limited to, a counterparty name (e.g., StubHub™) or a URL maintained by the counterparty (e.g., a URL of the StubHub™ website). Additionally, or alternatively, contextual data 342 may also include a URL or other unique address of payment processor associated with the counterparty, e.g., W3C™ payment request API 334 or W3C™-compatible payment application 340.

Additionally, in some instances, W3C™-compatible payment application 340 may also perform operations that identify and extract, from application data 112 through the browser-specific API, additional information that specifies one or more authentication credentials assigned to user 101, e.g., local authentication data 344. Examples of local authentication data 344 include, but are not limited to, an alphanumeric user name or login credential, an alphanumeric password, or one or more biometric credentials captured by client device 102 during the initial registration process, such as a scanned fingerprint of user 101 or a captured digital image of a portion of user 101's face. As illustrated in FIG. 3D, W3C™-compatible payment application 340 may perform operations that generate output data 346 that includes portions of contextual data 342 or local authentication data 344 to one or more application modules executed by client device 102, e.g., through the corresponding browser-specific API.

In some examples, upon execution by client device 102, context discovery engine 110, either alone or in conjunction with web browser 108, may perform any of the exemplary processes described herein that interrupt a current browser session on client device 102 (e.g., as established by one or more web pages accessed and rendered for presentation by web browser 108), and intercept or extract data, e.g., contextual data, that characterizes a context of an initiated exchange of data between user 101 and a corresponding counterparty, such as a merchant associated with the accessed web pages. As described herein, context discovery engine 110 may output portions of the contextual data, along with portions of locally maintained authentication data for user 101, to one or more executable application modules of client device 102, e.g., directly or through a secure, programmatic interface established and maintained by web browser 108.

Client device 102 may, in conjunction with context discovery system 130 and tokenization system 170, perform any of the exemplary processes described herein to authenticate an identity of user 101 based on portions of local authentication data 306, to identify a payment instrument available for use in the initiated purchase transaction that is consistent with a specified preference of user 101, portions of contextual data 304, or with data characterizing one or more prior purchase transactions, and to obtain tokenized data representative of the available payment instrument. In other instances, and as described herein, client device 102 and context discovery system 130 may perform additional, or alternate, operations that identify one or more services available to user 101 and consistent with portions of contextual data 304.

Figure 4A:
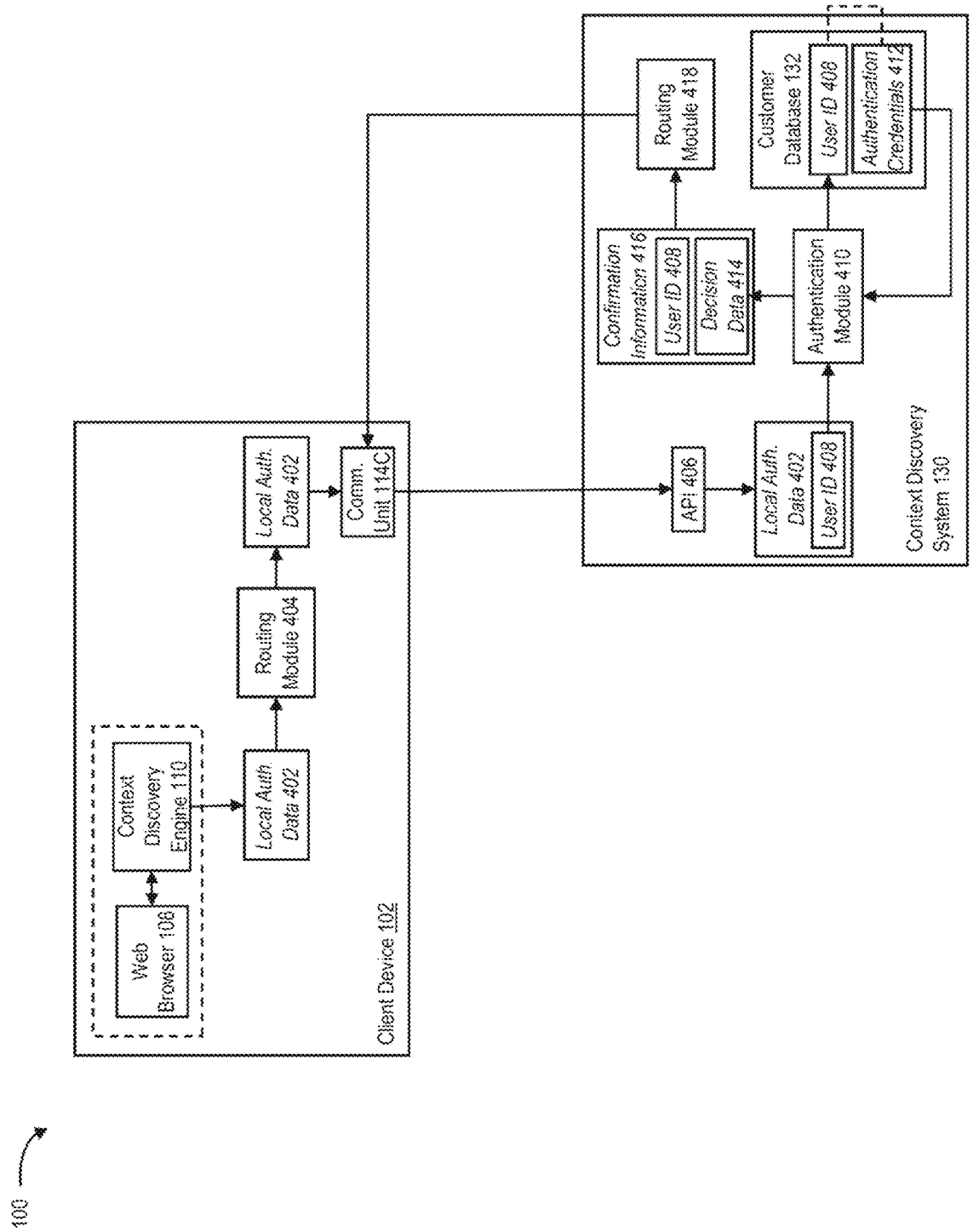

Referring to FIG. 4A, context discovery engine 110 may perform operations that output elements of local authentication data 402 to a routing module 404 of client device 102. In some instances, the elements of local authentication data 402 may enable a user of client device 102, e.g., user 101, to access a digital portion of web page associated with, or hosted by, context discovery system 130, and may include, but are not limited to, an alphanumeric user name or login credential, an alphanumeric password, or a biometric authentication credential (e.g., a digital image of user 101's face, a fingerprint scan, etc.). Further, and as described herein, context discovery engine 110 may output local authentication data 402 directly to routing module 404, or through a corresponding programmatic interface established and maintained by web browser 108, e.g., a browser-specific application programming interface (API).

Routing module 404 may receive local authentication data 402 and obtain a network address that uniquely identifies context discovery system 130, such as an IP address or a MAC address (e.g., as maintained within a locally accessible memory). Further, in some instances, routing module 404 may provide local authentication data 402 and the obtained network address of context discovery system 130 to communications unit 114C, which may transmit local authentication data 402 across network 120 to the network address of context discovery system 130.

As illustrated in FIG. 4A, a programmatic interface established and maintained by context discovery system 130, such as application programming interface (API) 406, may receive local authentication data 402 from client device 102. API 406 may provide local authentication data 402 as an input to an authentication module 410, which may store local authentication data 402 within one or more tangible, non-transitory memories. In some instances, authentication module 410 may parse local authentication data 402 to extract an identifier 408 of user 101, e.g., the alphanumeric user name or login credential described herein, and access one or more data records of customer database 132 that include, or reference, user identifier 408.

Authentication module 410 may parse the identified data records and extract, from the identified data records, authentication data 412 associated with, or linked to, user identifier 408. In some instances, and as described herein, authentication data 412 may include one or more authentication credentials assigned to, or selected by, user 101 during initial registration processes involving client device 102 and context discovery system 130, and examples of authentication data 412 include, but are not limited to, an alphanumeric user name or login credential, an alphanumeric password, or a biometric authentication credential (e.g., a digital image of user 101's face, a fingerprint scan, etc.).

In some examples, authentication module 406 may perform operations that authenticate an identity of user 101 based on a comparison of portions of local authentication data 402 (e.g., as received from client device 102) and corresponding portions of authentication data 412 (e.g., as extracted from customer database 132). Authentication module 406 may generate decision data 414 indicative of an outcome (e.g., successful or unsuccessful) of the authentication process, and may perform operations that package decision data 414 into a corresponding portions of confirmation information 416, along with user identifier 408. Authentication module 406 may provide confirmation information 416 as an input to a routing module 418 of context discovery system 130, which may perform operations that cause context discovery system 130 to transmit confirmation information 416 across network 120 to client device 102.

Communications unit 114C of client device 102 may receive confirmation information 416, and may perform operations that route confirmation information 416 to context discovery engine 110, either directly or through the browser-specific API described herein. In some instances, context discovery engine 110 may perform operations that store confirmation information 416 within one or more tangible, non-transitory memories, and that parse confirmation information to extract decision data 414, which indicates a successful or unsuccessful outcome of the authentication of the identity of user 101 by context discovery system 130.

In one example, based on portions of decision data 414, context discovery engine 110 may establish that context discovery system 130 failed to authenticate the identity of user 101 based on local authentication data 402 (or may establish that user 101 fails to represent a registered customer of context discovery system 130). Based on the failed authentication, context discovery engine 110 may discard the intercepted contextual data that characterized the initiated purchase transaction, and may generate and route additional information to web browser 108 (e.g., directly or through a corresponding, browser-specific API, as described herein). When rendered for presentation within a corresponding interface, such as browser window 210 of FIGS. 2A and 2B, the additional information may prompt user 101 to provide further input to client device 102 that specifies a payment instrument available to fund the initiated purchase transaction (e.g., as set forth by input fields 228A, 230A, and 232B).

Alternatively, and as described below in reference to FIG. 4B, context discovery engine 110 may determine that context discovery system 130 successfully authenticated the identity of user 101 based on the portions of local authentication data 402. In response to the successful authentication of user 101's identity, context discovery engine 110 may establish that user 101 is a registered customer of context discovery system 130, and context discovery engine 110 may perform operations, either alone or in conjunction with web browser 108, that cause client device 102 to pass contextual data 420 to context discovery system 130.

In some examples, contextual data 420 may identify and characterize a purchase transaction initiated by user 101 based on input provided to client device 102 during a browser session (e.g., via input unit 114B in response to one or more accessed and presented web pages). For instance, and as described herein, the initiated purchase transaction may correspond to an initiated $340.00 purchase of two tickets to the Washington Capitals™ hockey match on Apr. 19, 2018, from a website maintained by StubHub™, and contextual data 420 may include information that identifies and characterized the initiated purchase transaction, and additionally, or alternatively, the initiating customer (e.g., user 101 that operates client device 102) and the counterparty (e.g., the StubHub™ website).

By way of example, contextual data 420 may include, but is not limited to, an identifier of each of the purchase products or services (e.g., a UPC code assigned to each of the purchased tickets, etc.), a value of the purchased product or service (e.g., a $280 face value of the purchased tickets), a value of a local tax applied to the purchase transaction (e.g., $28.00 in sales tax), a selected shipping provider or mechanism (e.g., two-day delivery by FedEx™), a cost associated with the selected shipping provider or mechanism (e.g., $32.00), or a total transaction value of the purchase transaction (e.g., $340.00). In further examples, contextual data 420 may also include an identifier of user 101 (e.g., a name, such as "John Smith"), and information characterizing the counterparty, such as, but not limited to, a counterparty name (e.g., StubHub™) or a URL maintained by the counterparty (e.g., a URL of the StubHub™ website). Further, in some instances, contextual data 420 may also include a URL of a payment processes associated with the counterparty, e.g., the payment processor that services the StubHub™ website. The disclosed embodiments are, however not limited to these examples of contextual data, and in other examples, contextual data 420 may include any additional or alternate information that characterizes the initiated purchase transaction, the counterparty, or user 101.

Figure 4B:
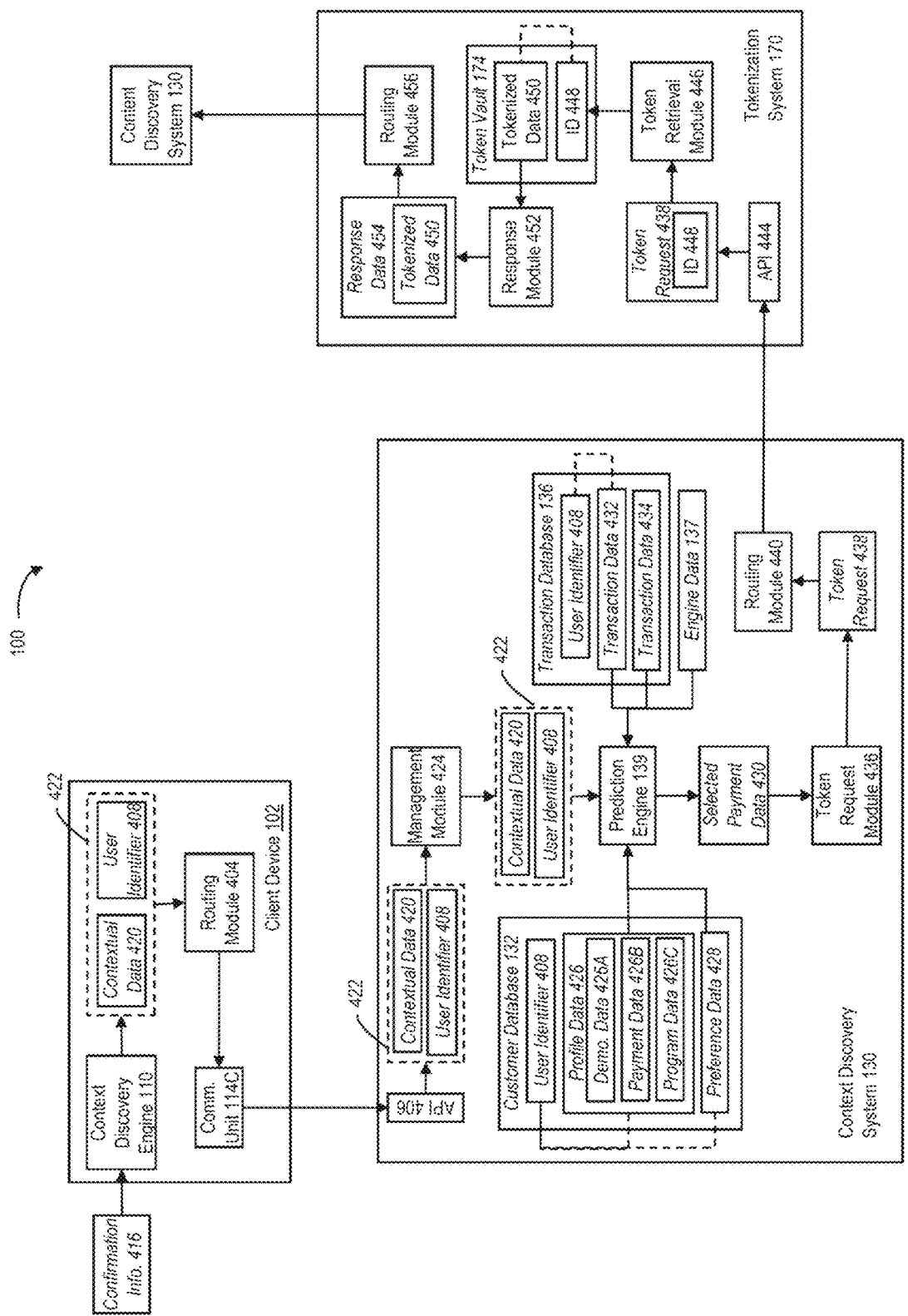

Referring to FIG. 4B, context discovery engine 110 may perform operations that generate a contextual data package 422 that includes user identifier 408 (e.g., that uniquely identifies user 101 to context discovery system 130) and portions of contextual data 420, and that provide contextual data package 422 to routing module 404, e.g., directly or through the browser-specific API described herein. Routing module 404 may receive contextual data package 422 and perform operations that obtain the unique network address of context discovery system 130, as described herein. Further, in some instances, routing module 404 may provide contextual data package 422 and the network address of context discovery system 130 to communications unit 114C, which may transmit contextual data package 422 across network 120 to the network address of context discovery system 130.

API 406 of context discovery system 130 may receive and route contextual data package 422 to a management module 424, which may store contextual data package 422 within one or more tangible, non-transitory memories. Management module 424 may provide contextual data package 422 as an input to prediction engine 139, which may parse contextual data package 422 to extract user identifier 408 and contextual data 420. Based on portions of extracted contextual data 420, predictive engine 139 may perform any of the exemplary processes described herein to identify a payment instrument held by user 101 and available for use in the initiated purchase transaction, e.g., the $340.00 purchase of two tickets to the Washington Capitals™ hockey match on Apr. 19, 2018, from StubHub™ website.

For example, and as illustrated in FIG. 4B, predictive engine 139 may access the data records of customer database 132 (e.g., as maintained by context discovery system 130 within one or more tangible, non-transitory memories), and perform operations that identify and access elements of profile data 426 and preference data 428 that include, or that reference, user identifier 408 (e.g., that uniquely identifier user 101). In some instances, profile data 426 may include information that identifies and characterizes user 101, such as, but not limited to, a full name of user 101, an email address associated with user 101, or a mobile telephone number associated with user 101.

Further, and as illustrated in FIG. 4B, profile data 426 may also include demographic data 426A that includes a value of one or more demographic parameters that characterize user 101, such as, but not limited to, an age, a gender, an occupation, an educational level, or an income level of user 101. Profile data 426 may include payment data 426B that identifies and characterizes one or more payment instruments held by user 101, and program data 426C that identifies and characterizes one of more rewards or loyalty programs in which user 101 participates.

For example, payment data 426B may include an identifier of one or more payment instruments held by user 101 (e.g., a Visa™ debit card linked to a deposit account held by user 101, a Visa™ credit card, and an American Express™ credit card), along with tokenized account data associated with each of the one or more payment instruments. Further, program data 426C may include an identifier of each of the one or more rewards or loyalty programs, an entity that provides or supports each of the one or more rewards or loyalty programs (e.g., a URL of a web page, etc.), along with information that characterizes a current status of each of the loyalty or rewards programs (e.g., a current balance of accrued "points") and a scheme by which user 101 accrues points within each of the loyalty or rewards programs.

By way of example, preference data 428 may include information that identifies one or more user-specified preferences for funding purchase transactions using corresponding ones of the available payment instruments held by user 101 (e.g., as specified within corresponding portions of payment data 426B). In one instance, preference data 428 may specify a preference to fund any initiated purchase transaction using a particular one of the available payment instrument, e.g., a "favorite" payment instrument, such as the American Express™ credit card. In other instances, preference data 428 may associate a particular payment instrument with purchase transactions characterized by specified parameter values (e.g., a specified transaction value, or a specified ranges of transaction values), with purchase transactions involving specified products or types of products, with purchase transactions involving a specific counterparty or a specified type of counterparty (e.g., a specified merchant, a merchant characterized by a specified merchant category code), or any combination thereof.

For example, payment data 426B may identify and characterize available payment instruments that include, but are not limited to, a Visa™ debit card linked to a deposit account held by user 101, a Visa™ credit card, and an American Express™ credit card. In some instances, preference data 428 may specify that the Visa™ debit card be used to fund any purchase transaction having a transaction value less than $20.00 and additionally, or alternatively, that the American Express™ credit card be used to fund any purchase transaction having a transaction value greater than $250.00. In other instances, preference data 428 may specify that the Visa™ credit card be used to fund any purchase transaction involving groceries or fuel (e.g., as specified by assigned UPCs), or that the American Express™ credit card be used to fund any purchase transaction involving an online or digital retailer, a merchant located outside the United States, or specific merchant, such as an airline ticket agent (e.g., based on corresponding assigned MCCs or merchant identifiers).

In further instances, preference data 428 may also include information that enables predictive engine 139 to select one of the available payment instruments (e.g., as specified within payment data 426B) to fund an initiated purchase transaction based on a characteristic of the available payment instruments, such as, but not limited to, an imposed interest rate on carried balance or a grace period. In other instances, preference data 428 may include additional, or alternate, information that enables predictive engine 139 to select one of the available payment instruments to fund a purchase transaction based on an impact of the purchase transaction on one or more rewards or loyalty programs in which user 101 participates (e.g., as specified within program data 426C). For example, preference data 428 may specify that predictive engine 139 select the available payment instrument that would maximize an impact of the purchase transaction on a current balance of a corresponding one of the rewards or loyalty programs. The disclosed embodiments are, however, not limited to these examples of user-specified preferences or preference data, and in other instances, preference data 428 may include any additional or alternate preference data that would facilitate a selection of an available payment instrument to fund a purchase transaction.

Referring back to FIG. 4B, predictive engine 139 may access payment data 426B, which identifies and characterizes the available payment instruments, program data 426C, which identifies and characterizes the rewards and loyalty programs in which user 101 participates, and preference data 428, which identifies the user-specified preferences for funding purchase transactions using corresponding ones of the available payment instruments. In some examples, predictive engine 139 may perform any of the exemplary processes described herein to select one of the available payment instruments (e.g., as specified within payment data 426B) to fund the initiated purchase transaction based on a comparison between elements of contextual data 420, which characterize the initiated purchase transaction, and corresponding elements of preference data 428.

For example, predictive engine 139 may extract elements of preference data 428 that specify the selection of the available American Express™ credit card to fund purchase transactions having transaction values in excess of $250.00. Predictive engine 139 may extract, from contextual data 420, the transaction value of $340.00 for the purchase of the two tickets to the Washington Capitals™ hockey match on Apr. 19, 2018, and select the available American Express™ credit card to fund the initiated purchase transaction. In some instances, predictive engine 139 may perform operations that identify and extract, from payment data 426B, payment information that identifies and characterized the selected American Express™ credit card, such as, but not limited to, a unique identifier of the selected American Express™ credit card. Predictive engine 139 may perform additional operations that package the extracted payment information, which identifies and characterizes the selected American Express™ credit card, into portions of selected payment data 430.

Additionally, or alternatively, predictive engine 139 may also select one of the available payment instruments (e.g., as specified within payment data 426B) to fund the initiated purchase transaction based on an application of one or more machine learning algorithms or adaptive processes to elements of transaction data characterizing prior purchase or financial services transactions involving user 101, client device 102, or other user of context discovery system 130 (e.g., as maintained within transaction database 136). For example, as illustrated in FIG. 4B, predictive engine 139 may accesses transaction data 432 (e.g., that identifies and characterizes prior purchase or financial services transactions initiated by client device 102 or involving user 101) and additionally, or alternatively, transaction data 434 (e.g., that identifies and characterizes additional prior purchase or financial services transactions initiated by the other client devices or involving the users of these client devices). Further, in some instances, predictive engine 139 may also access portions of predictive engine data 137 (e.g., as maintained by context discovery system 130 in one or more tangible, non-transitory memories) that specify and/or support the execution of the machine learning algorithms or adaptive processes.

Examples of the one or more machine learning algorithms or adaptive processes include, but are not limited to, an association-rule algorithm (such as an Apriori algorithm, an Eclat algorithm, or an FP-growth algorithm), a clustering algorithm (such as a hierarchical clustering module, a k-means algorithm, or other statistical clustering algorithms), a collaborative filtering algorithm (such as a memory- or model-based algorithm), or an artificial intelligence algorithm (such as an artificial neural network). Further, and as described herein, one or more of these machine learning algorithms or adaptive processes may be trained against, and adaptively improved using, certain portions of transaction database 136, including those portions that identify and characterize purchase transactions recently initiated by user 101 or client device 102.

As described herein, predictive engine 139 may selected one of the available payment instruments to fund the initiated purchase transaction (e.g., the $340.00 purchase of two tickets to the Washington Capitals™ hockey match on Apr. 19, 2018, from StubHub™ website) based on an application of the one or more machine learning algorithms or adaptive processes to portions of transaction data 432 and additionally, or alternatively, to transaction data 434. For example, predictive engine 139 may select the available American Express™ credit card to fund the initiated purchase transaction, and may perform any of the exemplary processes described herein to package the payment information that identifies and characterizes the selected American Express™ credit card into portions of selected payment data 430.

Predictive engine 139 may, in some instances, provide selected payment data 430 as an input to a token request module 436 of context discovery system 130, which may perform operations that package selected payment data 430 into a token request 438 for tokenized data representative of the selected payment instrument, e.g., the American Express™ card. In some examples, token request module 436 may provide token request 438 as an input to a routing module 440 of context discovery system 130, which may receive token request 438 and extract a unique network address of tokenization system 170 from one or more tangible, non-transitory memories, e.g., from TSP data 140 (not illustrated in FIG. 4B). Routing module 440 may perform operations that cause context discovery system 130 to transmit token request 438 across network 120 to the network address of tokenization system 170, e.g., using any appropriate communications protocols.

A programmatic interface established and maintained by tokenization system 170, such as application programming interface (API) 444, may receive token request 438 from context discovery system 130. By way of example, API 444 may provide token request 438 as an input to a token retrieval module 446 of tokenization system 170. In some examples, token retrieval module may parse token request 438 to extract an identifier 448 of the selected American Express™ credit card, and access token vault 174 to identify one or more elements of tokenized data 450, such as a digital payment token, representative of the selected American Express™ credit card.

For example, tokenized data 450, e.g., the digital payment token, may include a tokenized account number, expiration date, or card verification value of the selected American Express™ credit card, and may possess no extrinsic or exploitable value to malicious third parties operating within environment 100. In other instances, tokenized data 450 may also include a billing address for the selected American Express™ credit card, and additionally or alternatively, a name of the cardholder or other information that facilitates a completion of the initiated purchase transaction, and an authorization of a corresponding payment, using the selected American Express™ credit card.

In some instances, token retrieval module 446 may extract tokenized data 450, e.g., the digital payment token, from token vault 174, and may provide tokenized data 450 as an input to a response module 452, which may package all or a portion of tokenized data 450 into response data 454. Response module 452 may provide response data 454 as an input to a routing module 456 of tokenization system 170, which may perform operations that cause tokenization system 170 to transmit response data 454 across network 120 to context discovery system 130.

Figure 4C:
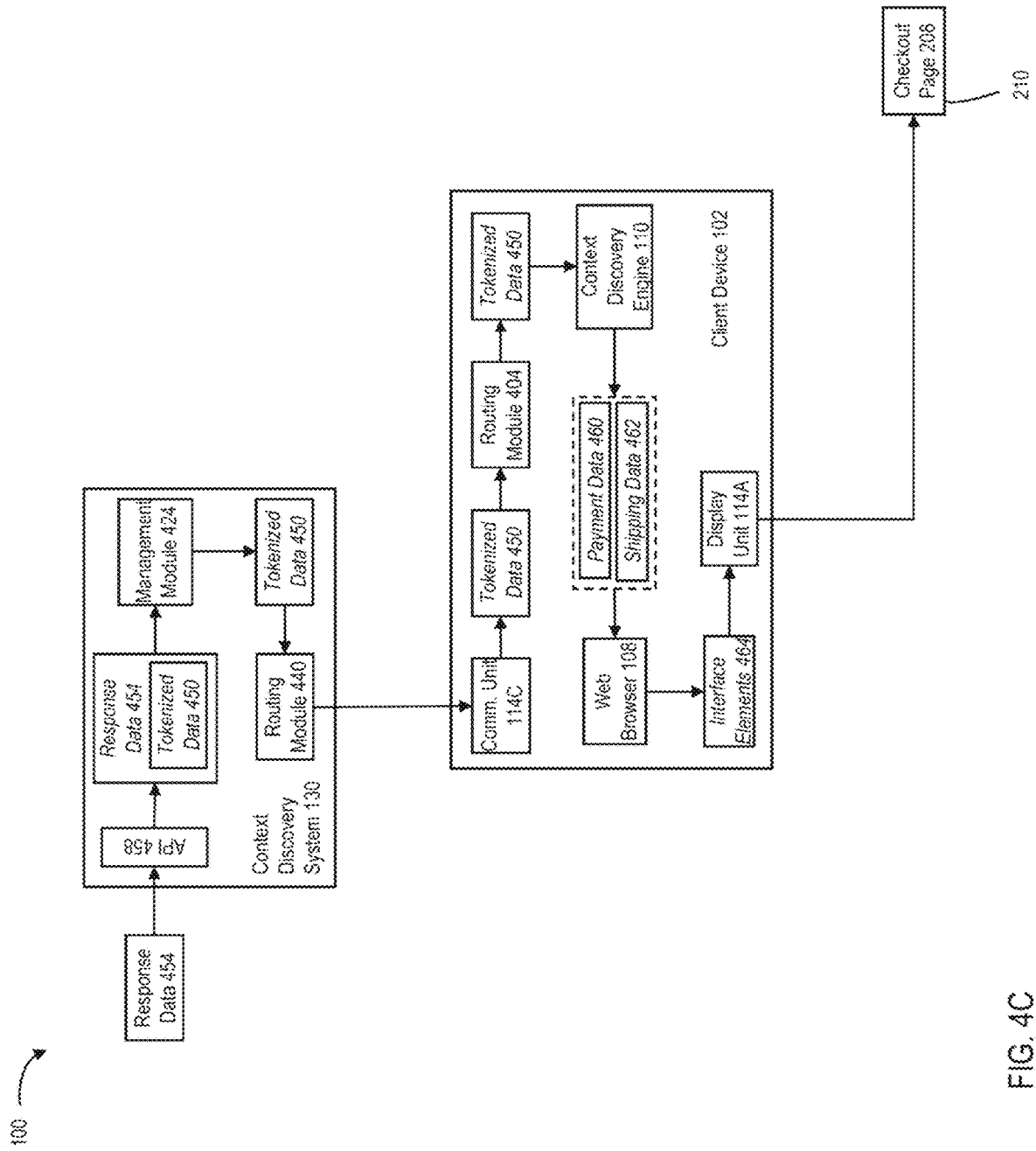

Referring to FIG. 4C, a programmatic interface established and maintained by context discovery system 130, such as application programming interface (API) 458, may receive response data 454 from tokenization system 170. API 458 may route response data 454 to management module 424 of context discovery system 130, which may perform operations that parse response data 454 and extract tokenized data 450, e.g., the digital payment token representative of the selected American Express™ credit card. Management module 424 may, in some instances, provide tokenized data 450 as an input to routing module 440, which may perform operations that cause context discovery system 130 to transmit tokenized data 450 across network 120 to client device 102.

Communications unit 114C of client device 102 may receive tokenized data 450, e.g., via a secure, programmatic interface (not illustrated in FIG. 4C), and provide tokenized data 450 as an input to routing module 404, which may forward tokenized data 450 to context discovery engine 110, e.g., directly or through a corresponding programmatic interface, such as a browser-specific application programming interface (API). In some examples, context discovery engine 110 may parse tokenized data 450, e.g., the digital payment token, to identify and extract tokenized payment data 460 that characterizes the selected American Express™ credit card (e.g., a tokenized account number, expiration date, or card verification code) and in some instances, shipping data 462 that includes the billing address associated with the selected American Express™ credit card. Further, context discovery engine 110 may pass tokenized payment data 460 and in some instances, shipping data 462, to executed web browser 108, e.g., directly or through the browser-specific API, and web browser 108 may perform any of the exemplary processes described herein to populate certain input fields of particular web page associate with the initiated payment transaction, e.g., checkout page 208 of the StubHub™ website, during the still-interrupted browser session on client device 102.

For example, and as described herein, context discovery engine 110 may include one or more executable mobile applications, such as mobile application 302 of FIG. 3A. In some instances, mobile application 302 may receive tokenized data 450, e.g., the digital payment token, from routing module 404, and mobile application 302 may perform operations that parse tokenized data 450 to identify and extract tokenized payment data 460 and additionally, or alternatively, shipping data 462. Further, mobile application 302 may pass tokenized payment data 450 and in some instances, shipping data 462, to executed web browser 108 through the browser-specific API. Web browser 108 may, for example, access application data 112 and update portions of locally maintained DOM data 204 to reflect tokenized payment data 460 and/or shipping data 462, and may perform any of the exemplary processes described herein to populate certain input fields of checkout page 208 of the StubHub™ website during the still-interrupted browser session on client device 102.

In other examples, as described herein, context discovery engine 110 may include one or more browser extensions or "add-ons," such as, but not limited to browser extension 312 of FIG. 3B. Browser extension 312 may receive tokenized data 450, e.g., the digital payment token, from routing module 404 through the browser-specific API and may perform operations that parse tokenized data 450 to identify and extract tokenized payment data 460 and additionally, or alternatively, shipping data 462. Further, browser extension 312 may pass tokenized payment data 460 and in some instances, shipping data 462, to executed web browser 108, which may access application data 112 and update portions of locally maintained DOM data 204 to reflect tokenized payment data 460 and/or shipping data 462. In some instances, web browser 108 may perform any of the exemplary processes described herein to populate certain input fields of checkout page 208 of the StubHub™ website during the still-interrupted browser session on client device 102.

Additionally, or alternatively, context discovery engine 110 may include one or more elements of code or instructions executable programmatically by web browser 108, such as JavaScript™ elements 322 of FIG. 3C, which caused web browser 108 to redirect portions of contextual data 324 and local authentication data 326 to an additional web page 328. In some examples, web page 328, which can be associated with or hosted by context discovery system 130, may receive tokenized data 450 (e.g., the digital payment token), and executed JavaScript™ elements 322 may access tokenized data 450 and parse tokenized data 450 to identify and extract tokenized payment data 460 and additionally, or alternatively, shipping data 462. Executed JavaScript™ elements 322 may pass tokenized payment data 460 and in some instances, shipping data 462, to executed web browser 108, e.g., through an HTTP redirect operation to checkout page 208 of the StubHub™ website. Web browser 108 may, in some instances, access application data 112 update portions of locally maintained DOM data 204 to reflect tokenized payment data 460 and/or shipping data 462, and perform any of the exemplary processes described herein to populate certain input fields of checkout page 208 of the StubHub™ website during the still-interrupted browser session on client device 102.

Further, in some examples, web browser 108 may correspond to a W3C™-compatible web browser, and context discovery engine 110 may include a W3C™-compatible mobile application, such as payment application 340 of FIG. 3D. Payment application 340 may receive tokenized data 450 (e.g., the digital payment token) as a W3C™ payment response through the browser-specific API, and may dispatch tokenized data 450 to W3C™ payment request API 334 of FIG. 3D, which may pass tokenized data 450 back to merchant-specific JavaScript™ elements 332 of FIG. 3D. In some examples, merchant-specific JavaScript™ elements 332 may perform operations that parse tokenized data 450 to identify and extract tokenized payment data 460 and additionally, or alternatively, shipping data 462, and may pass tokenized payment data 460 and in some instances, shipping data 462, to executed web browser 108. Web browser 108 may, in some instances, access application data 112 and update portions of locally maintained DOM data 204 to reflect tokenized payment data 460 and/or shipping data 462, and perform any of the exemplary processes described herein to populate certain input fields of checkout page 208 of the StubHub™ website during the still-interrupted browser session on client device 102.

Referring back to FIG. 4C, web browser 108 may perform operations that generate additional interface elements 464, which represent corresponding portions of tokenized payment data 460 (e.g., the tokenized account number, expiration date, or card verification code of the selected American Express™ credit card) and in some instances, shipping data 462 (e.g., the billing address associated with the selected American Express™ credit card). Web browser 108 may route generated interface elements 464 to display unit 114A, which may present interface elements 464 at corresponding positions within checkout page 208, e.g., as displayed on browser window 210, automatically and without additional input from user 101.

Figure 4D:
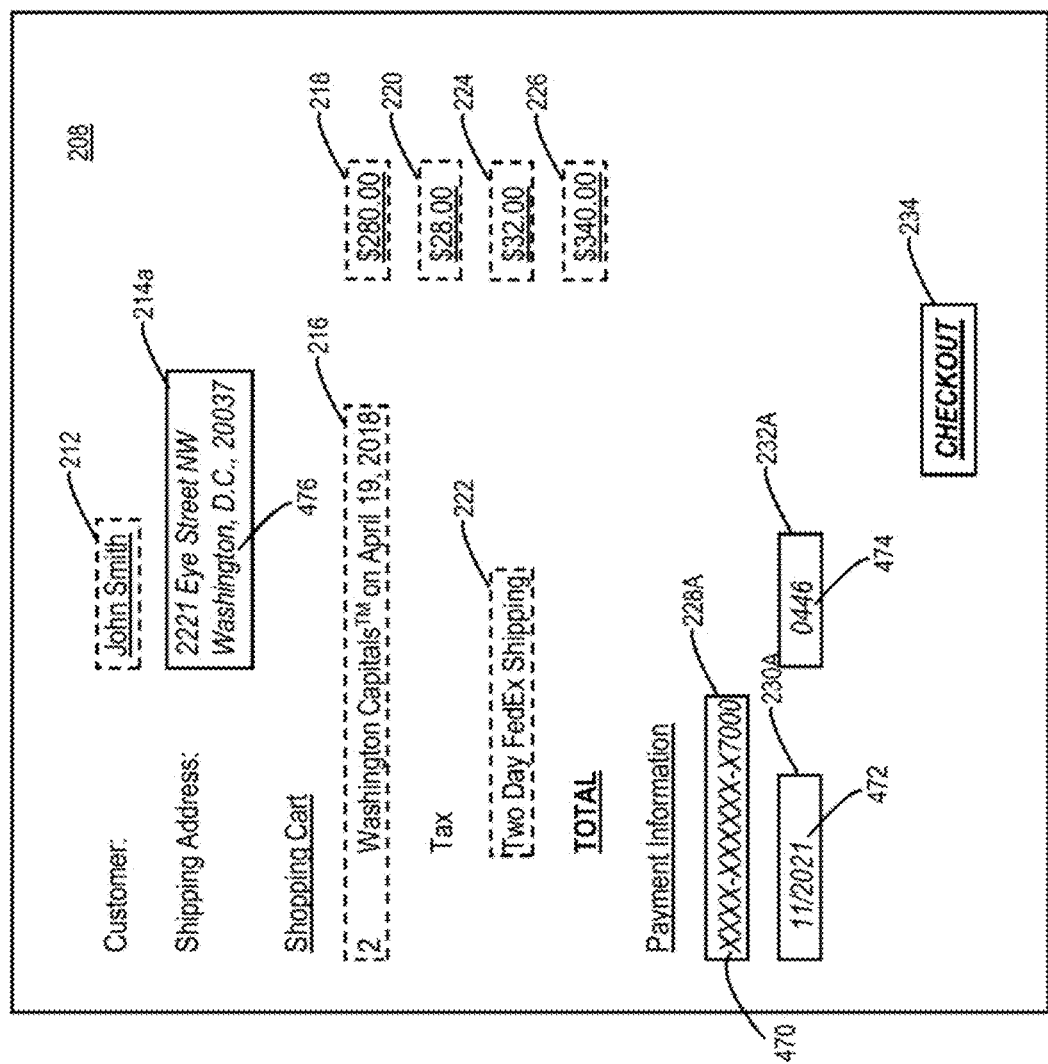
FIG. 4D is a diagram illustrating an exemplary portion of a graphical user interface, consistent with the disclosed embodiments.

For example, as illustrated in FIG. 4D, display unit 114A may present a tokenized account number 470 of the selected American Express™ credit card within input field 228A of checkout page 208, a tokenized expiration data 472 of the selected American Express™ credit card within input field 230A of checkout page 208, and a tokenized card verification value 474 of the selected American Express™ credit card within input field 232A of checkout page 208. Additionally, or alternatively, display unit 114A may also present a shipping address 476 for the initiated purchase transaction (e.g., the billing address of the selected American Express™ credit card, as extracted from tokenized data 450) within input field 214A of checkout page 208.

As described herein, context discovery engine 110 may, in conjunction with web browser 108 and display unit 114A, perform operations that automatically update rendered and presented checkout page 208 (e.g., within browser window 210) to reflect portions of tokenized data 450 without additional input from user 101. In further examples, context discovery engine 110 and web browser 108 may perform additional operations, either alone or collectively, that execute automatically the initiated purchase transaction (e.g., the $340.00 purchase of two tickets to the Washington Capitals™ hockey match on Apr. 19, 2018, from StubHub™ website) in accordance with tokenized payment data 460 and/or shipping data 462 without additional input from user 101 (e.g., without additional input that selects the CHECKOUT icon established within checkout page 208 by interface elements 234). For example, not illustrated in FIGS. 4A-4D, web browser 108 may perform operations that package portions of transaction, payment, and shipping data that characterize the initiated purchase transaction (e.g., as maintained within DOM data 204) into a transaction request, which client device 102 may transmit across network 120 to an additional computing system associated with a payment network or a payment processor of the StubHub™ website.

Figure 5A:
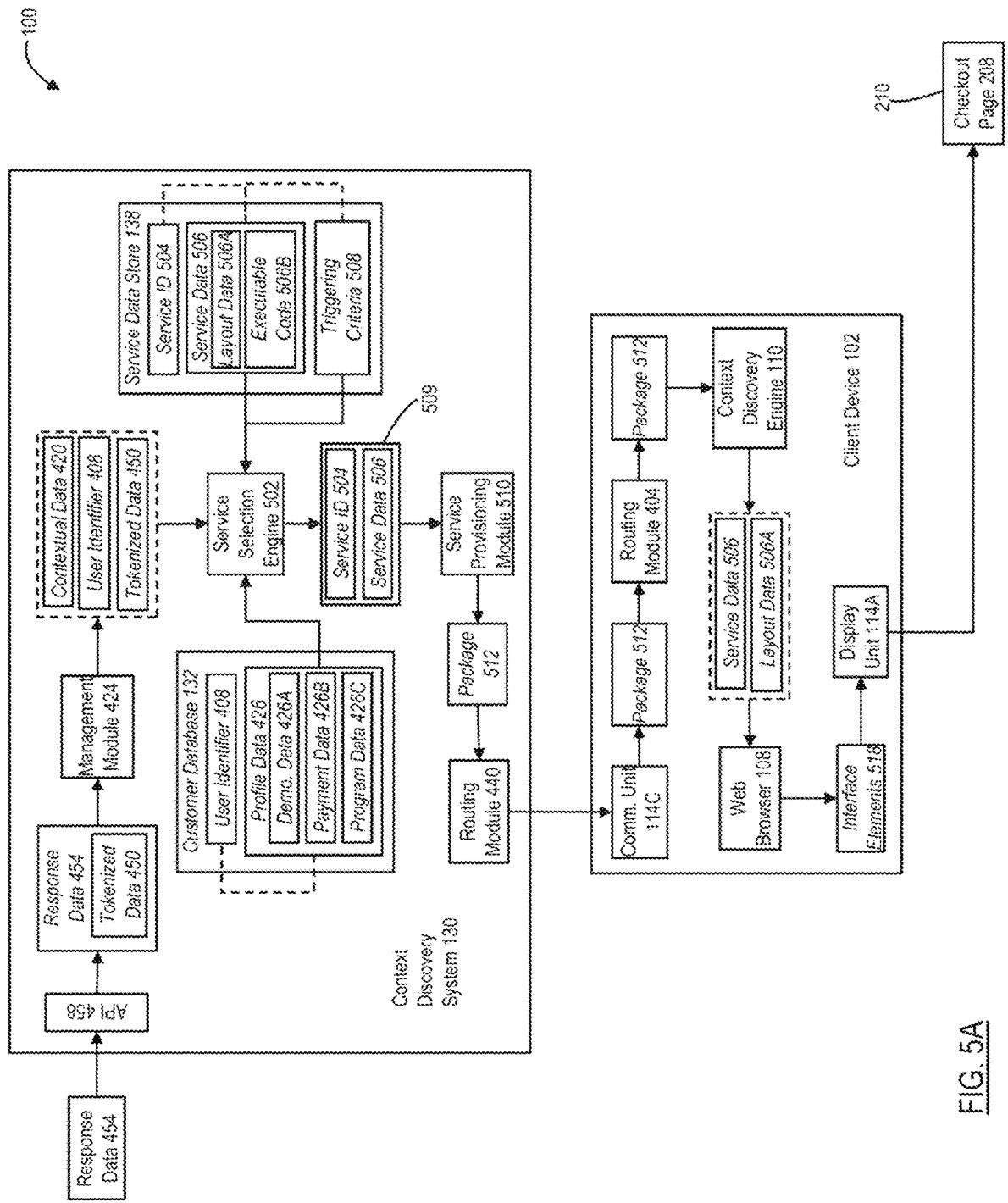
FIG. 5A is a diagram illustrating portions of an exemplary computing environment, consistent with the disclosed embodiments.

In other examples, and prior to executing the initiated purchase transaction, client device 102 and context discovery system 130 may perform additional operations that identify an available service based on portions of contextual data 420, and that provision that identified service to client device 102 during the currently interrupted browser session. Referring to FIG. 5A, management module 424 may receive response data 454 that includes tokenized data 450, e.g., the digital payment token representative of the American Express™ credit card selected to fund the initiated purchase transaction, e.g., the $340.00 purchase of the two tickets for the Washington Capitals™ hockey match on Apr. 19, 2018.

Referring to FIG. 5A, management module 424 may perform operations that parse response data 454 to extract tokenized data 450, and that store tokenized data 450 in one or more tangible, non-transitory memories (not illustrated in FIG. 5A). Further, in some examples, management module 424 may perform additional operations that route user identifier 408, contextual data 420, and additionally, or alternatively, tokenized data 450, to a service selection module 502, which may perform any of the exemplary processes described herein to select one or more available services for provisioning to client device 102 concurrently with the provisioning of tokenized data 450 to context discovery engine 110 of client device 102.

Service selection module 502 may receive user identifier 408, contextual data 420, and in some instances, tokenized data 450 from management module 424. Service selection module 502 may access the data records of customer database 132 (e.g., as maintained by context discovery system 130 within one or more tangible, non-transitory memories), and perform operations that identify and access elements of profile data 426 associated with or characterizing user 101, such as, but not limited to, the exemplary elements of demographic data 426A, payment data 426B, and program data 426C described herein. For example, demographic data 426A that includes a value of one or more demographic parameters that characterize user 101, such as, but not limited to, an age, a gender, an occupation, an educational level, or an income level of user 101. Further, profile data 426 may include payment data 426B that identifies and characterizes one or more payment instruments held by user 101, and program data 426C that identifies and characterizes one of more rewards or loyalty programs in which user 101 participates.

As illustrated in FIG. 5A, service selection module 502 may also access portions of service data store 138, which includes include information that identifies and characterizes one or more of the services available for provisioning to client device 102, and to user 101, during a current browser session established by client device 102. As described herein, one or more of the available services may be associated with the purchase transactions initiated by user 101 during the current browser session, and further, may be associated with and linked to certain elements of contextual data 420 that characterizes the potential purchase transaction.

By way of example, and as described herein, the one or more available services may include, but are not limited to, a real-time credit offer associated with certain elements of the intercepted transaction data, card-linked loyalty offer (CLLO) to enroll a payment instrument in a loyalty or rewards program, or a budgeting notification or alert service that provides notifications or alerts of a user- or merchant-specific budget impacted by the purchase transaction. Further, and as described herein, the one or more available services may include, but are not limited to, a competitive pricing service that provides real-time search results identifying other counterparties that offer for sale products or services similar to those involved the purchase transaction (e.g., at a comparable, or lower, transaction value), a purchase protection service that provides an offer for insurance coverage or damage protection for products or services involved in the purchase transaction, and a counterparty index service that provides data characterizing a reputation of a counterparty to the purchase transaction, e.g., the StubHub™ website.

Further, the one or more available services may, in some examples, also enable user 101 to delegate an electronic payment for the purchase transaction to one or more additional individuals (e.g., through a delegated payment service), or to initiate the electronic payment for the purchase transaction based on an established consensus between one or more individuals (e.g., through a consensus payment service). In other instances, the one or more services may also include an impulse-avoidance service, that limits or delays an ability of user 101 to initiate in real-time an electronic payment for the purchase transaction using any of the exemplary processes described herein. The disclosed embodiments are, however, not limited to these exemplary services, and in other instances, service data store 138 may include data that identifies and characterizes any additional or alternate service relevant to, and available for provisioning to client device 102 during, the current browser session.

In some examples, service data store 138 may maintain, for each of the available services, a unique service identifier 504 (e.g., an alphanumeric service name, etc.) along with additional service data 506 (e.g., metadata) that characterizes the service (e.g., a description of the available service). Further, and for each of the available service, service data 506 may also maintain elements of layout data 506A and executable code 506B. By way of example, when rendered for presentation by an executed web browser (e.g., by web browser 108 within browser window 210), each of the elements of layout data 506A identify and characterize a corresponding one of the available services and, in some instances, prompt user 101 to enter additional information (via input unit 114B) that facilitates a performance of the corresponding available service. Examples of layout data 506A include, but are not limited to, portions of HTML files, files that include other markup languages, or elements of executable code or script, such as JavaScript™ embedded within the HTML files. The elements of executable code 506B may include one or more applications, application modules, and other elements of code that, when executed by context discovery system 130, cause context discovery system 130 to perform operations in support of corresponding ones of the available services.

Service data store 138 may also link, for each of the available services, service identifier 504 and service data 506 with corresponding triggering data 508, which specifies triggering criteria that, when exhibited by the purchase transaction or by user 101, triggers a provision of a corresponding one of the available services using any of the exemplary processes described herein. For example, the triggering criteria for a corresponding one of the available services may specify a value of one or more transaction parameters (e.g., identifiers of purchased products or services or classes of products or services, a transaction value, etc.) that, when exhibited by the purchase transaction, would trigger the provisioning of the corresponding available service during the currently interrupted browser session (e.g., using any of the exemplary processes described herein).

Additionally, or alternatively, the triggering criteria for the corresponding available service may specify a value of one or more demographic parameters (e.g., an age or a range of ages, an income range, or an educational level) that, when exhibited by user 101, would also trigger the provisioning of the corresponding available service during the currently interrupted browser session (e.g., using any of the exemplary processes described herein). Further, in other examples, the triggering criteria for the corresponding available service may also specify a value of one or more parameters of a counterparty to the purchase transaction (e.g., a merchant name, data characterizing a merchant class, such as an assigned MCC, a merchant URL, etc.) that, when exhibited by the counterparty, would trigger the provisioning of the corresponding available service using any of the exemplary processes described herein. The disclosed embodiments are, however, not limited to these exemplary triggering criteria, and in other instances, triggering data 508 may identify any additional or alternate transaction-, user-, or counterparty-specific triggering criteria appropriate to the available service, such as a selection of a certain payment instrument, or combinations of the triggering criteria described herein.

In some instances, and as described herein, service selection module 502 may receive and parse contextual data 420 to identify, among other things, a transaction value of $340.00 for the initiated purchase transaction, an identifier of the product involved in the initiated purchase transaction (e.g., the UPC assigned to each of the Washington Capitals™ hockey tickets), and a counterparty identifier (e.g., the URL of checkout page 208 of the StubHub™ website). Further, and based on portions of accessed demographic data 426A, service selection module 502 may determine that user 101 corresponds to a thirty-nine-year-old engineer residing in New Haven, Conn., and having an income that exceeds $150,000. In other instances, and based on portions of accessed service data store 138, service selection module 502 may determine that service identifier 504 and service data 506 identify and characterize an available service that include a delivery of a real-time offer of credit to user 101 (e.g., as provided by a financial institution that operated context discovery system 130 or issuer system 150), and that triggering data 508 specifies triggering criteria for the available credit offer that include, but are not limited to, a transaction value that exceeds $300 and a user income that exceeds $100,000.

Based on an application of the specified triggering criteria to the portions of contextual data 420 and demographic data 426A, service selection module 502 may select to provision the available real-time credit offer to client device 102 during the currently interrupted browser session (e.g., as the $340 transaction value of the purchase transaction exceeds $300, and the income of user 101 exceeds the specific user income of $100,000). Service selection module may extract portions of service identifier 504 and service data 506 (e.g., that identify and characterize the selected real-time credit offer) from service data store 138, and may provide the extracted portions of service identifier 504 and service data 506, e.g., as selected service data 509, as inputs to service provisioning module 510. In some examples, service provisioning module 510 may execute, and perform operations consistent with, one or more elements of executable code 506B, and may package all, or a portion of service identifier 504 and service data 506 into a corresponding service data package 512. Service provisioning module 510 may provide as an input to routing module 440, which may perform operations that cause context discovery system 130 to transmit service data package 512 across network 120 to client device 102.

For example, service data package 512 may include service identifier 504, portions of service data 506 that identify and characterize the selected real-time credit offer, and portions of layout data 506A that enable a web browser, such as web browser 108 executed by client device 102, to render information characterizing the real-time credit offer within a corresponding interface, such as browser window 210. Further, in some examples, context discovery system 130 may perform operations that select and provision one or more of the available services (e.g., the real-time credit offer) to client device subsequent to, and responsive to, the provision of the digital payment token representative of the selected American Express™ credit card by context discovery system 130. In other examples, and consistent with the disclosed embodiments, context discovery system 130 may perform any of the exemplary processes described herein to provision concurrently the digital payment token (e.g., identifying a payment instrument selected to fund the initiated purchase transaction) and the one or more available services (e.g., that are consistent with the initiated purchase transaction) to client device 102.

Referring back to FIG. 5A, communications unit 114C of client device 102 may receive service data package 512, e.g., via a secure, programmatic interface (not illustrated in FIG. 4C), and provide service data package 512 as an input to routing module 404, which may forward service data package 512 to context discovery engine 110, e.g., directly or through a corresponding programmatic interface, such as a browser-specific application programming interface (API). In some examples, context discovery engine 110 may parse service data package 512 to identify and extract the portions of service data 506 that characterize the select real-time credit offer and the portions of layout data 506A, and may perform any of the exemplary processes described herein to pass the extracted portions of service data 506 and layout data 506A to executed web browser 108, e.g., directly or through the browser-specific API.

Web browser 108 may perform any of the exemplary processes described herein to render the extracted portions of service data 506 and layout data 506A, which identify and characterize the real-time credit offer, for presentation within a corresponding web page associated with the initiated purchase transaction, e.g., checkout page 208 of the StubHub™ website, during the still-interrupted browser session on client device 102. In some instances, and as described herein, web browser 108 may access application data 112 and update portions of locally maintained DOM data 204 to reflect the extracted portions of service data 506 and layout data 506A.

Further, web browser 108 may perform any of the exemplary processes described herein to generate additional interface elements 518, which represent corresponding portions of the extracted service data 506 and layout data 506A. Web browser 108 may route generated interface elements 518 to display unit 114A, which may present interface elements 518 at corresponding positions within checkout page 208, e.g., as displayed on browser window 210, automatically and without additional input from user 101.

Figure 5B:
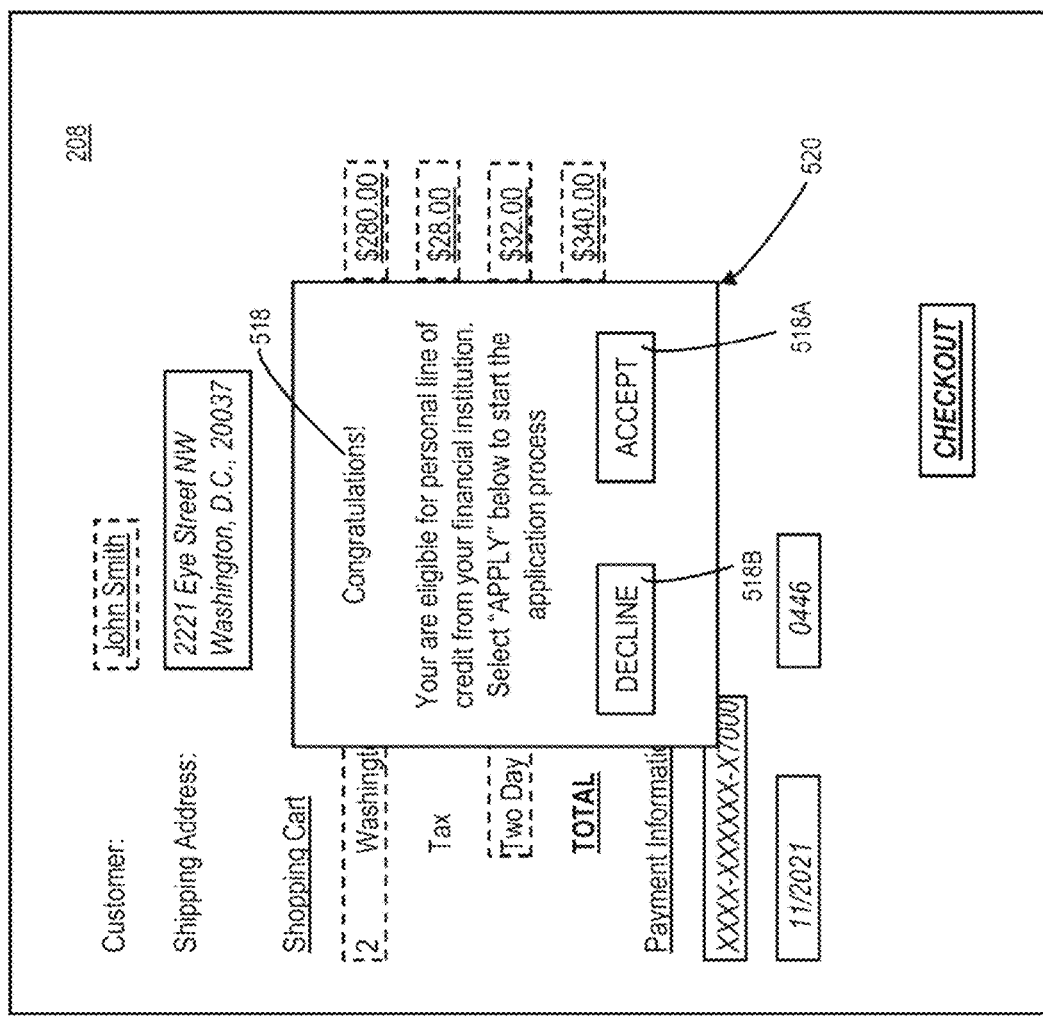
FIG. 5B is a diagram illustrating an exemplary portion of a graphical user interface, consistent with the disclosed embodiments.

For example, as illustrated in FIG. 5B, display unit 114A may present interface elements 518, which identify and characterize the real-time credit offer, at a position 520 within browsing window 210 that obscures a portion of checkout page 208. Further, in some instances, presented interface elements 518 may include one or more first interface elements 518A that, when rendered for presentation within browsing window 210, establish a first selectable icon (e.g., an "ACCEPT" icon), and one or more second interface elements 518B that, when rendered for presentation within browsing window 210, establish a second selectable icon (e.g., a "DECLINE" icon). For example, user 101 may elect to accept the real-time credit offer, and user 101 provide input to client device 102, e.g., via input unit 114B, that selects the first selectable icon established by first interface elements 518A (not illustrated in FIG. 5B).

In response to the selection of the first selectable icon, web browser 108 may perform operations that redirect (e.g., via a HTTP redirect process) portions of the contextual data characterizing presented checkout page 208 (e.g., as maintained within DOM data 204) to one or more web pages associated with the real-time credit offer, such as, but not limited to, those may be hosted by a network-connected computer system operated by the financial institution associated with context discovery system 130 or issuer system 150. Response to these additionally rendered and presented web pages, user 101 may provide additional input to client device 102, e.g., via input unit 114B, that applies for the real-time credit offer. Upon completion of the application process for the real-time credit offer, web browser 108 may be redirected back to checkout page 208 of the StubHub™ website, and context discovery engine 110 and/or web browser 108 may perform any of the exemplary processes described herein to execute the initiated purchase transaction automatically and without additional input from user 101 (e.g., in accordance with elements of user, counterparty, shipping, transaction, and payment data that populate checkout page 208).

Alternatively, user 101 may elect to decline the real-time credit offer, and user 101 provide input to client device 102, e.g., via input unit 114B, that selects the second selectable icon established by second interface elements 518B (not illustrated in FIG. 5B). In response to the selection of the second selectable icon, web browser 108 may be redirected back to checkout page 208 of the StubHub™ website, and context discovery engine 110 and/or web browser 108 may perform any of the exemplary processes described herein to execute the initiated purchase transaction automatically and without additional input from user 101 (e.g., in accordance with elements of user, counterparty, shipping, transaction, and payment data that populate checkout page 208).

Figure 6:
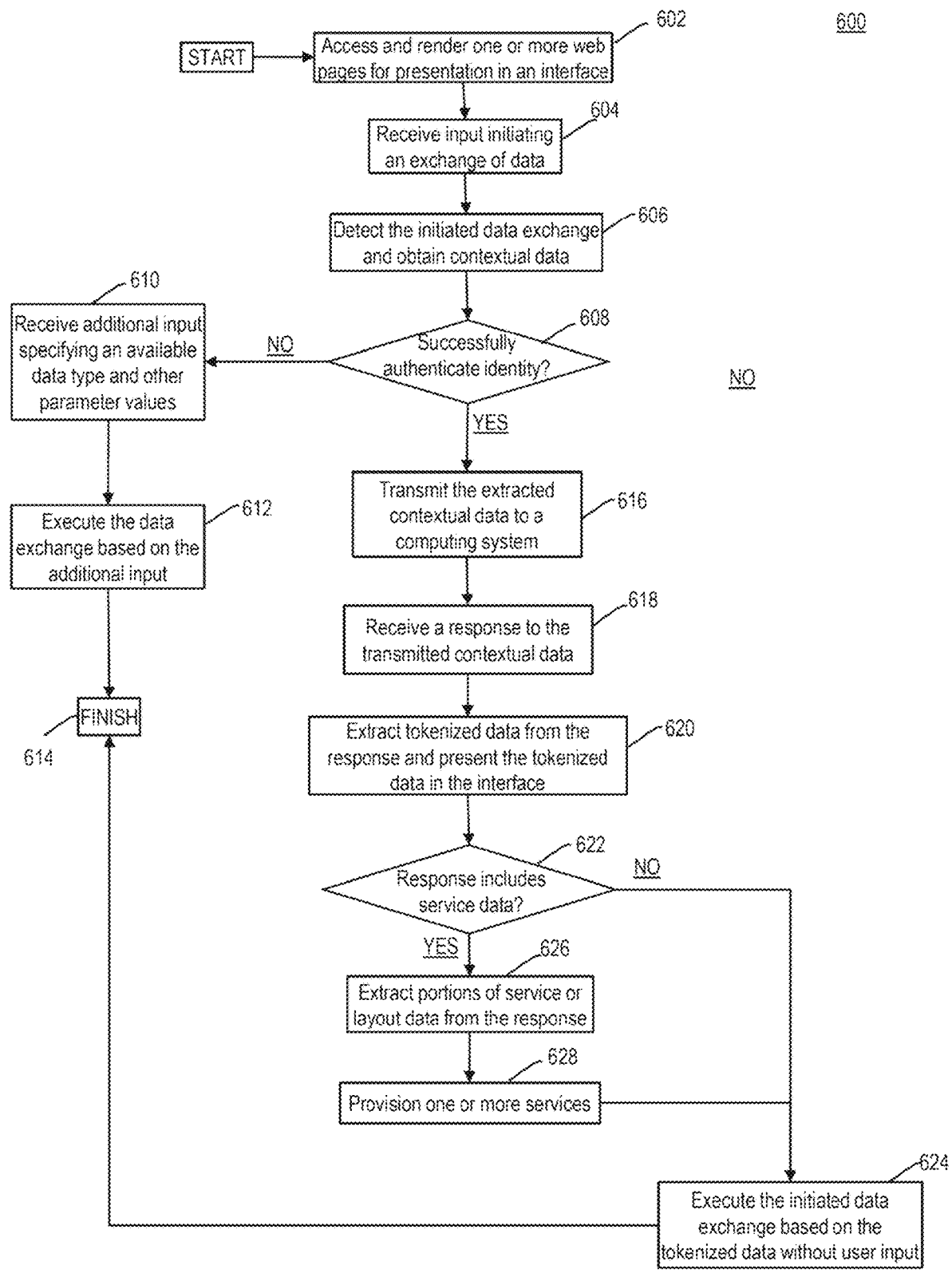
FIGS. 6 and 7 are flowcharts of exemplary processes for provisioning a digital token to a network-connected client device in real-time based on contextual data, consistent with the disclosed embodiments.

FIG. 6 is a flowchart of an exemplary process 600 for provisioning a digital token to a network-connected client device in real-time based on contextual data characterizing a current browser session. In some instances, client device 102 may perform all or a portion of the steps of exemplary process 600, which include, but are not limited to, monitoring one or more web pages rendered for presentation by an executed web browser, such as web browser 108, during a current browser session, detecting an initiation of an exchange of data during that current browser session, and based on contextual data that characterizes the initiated data exchange.

As described herein, client device 102 may perform operations that obtain tokenized data representative of an available data type for the initiated data exchange, and in some instances, service data identifying and characterizing one or more services available to client device 102 and associated with the initiated data exchange. Client device 102 may perform any of the exemplary processes described herein to present portions of the tokenized data within a web page associated with the initiated data exchange and additionally, or alternatively, present additional information that identifies and characterizes the one or more available services, automatically and without input from user 101. In further instances, client device 102 may perform additional operations that execute the initiated data exchange in accordance with the portions of the tokenized data in real-time, and without further input from user 101.

Referring to FIG. 6, client device 102 may perform operations that access and render for presentation one or more web pages, which collectively establish a current browser session on client device 102 (e.g., in step 602). By way of example, and as described herein, each of the one or more accessed web page may each be associated with data characterizing a corresponding page structure, such as a document object model (DOM), and a web browser executed by client device 102, such as web browser 108 of FIG. 1, may obtain and store within a locally accessible memory. Further, and as described herein, web browser 108 may access and parse the stored data characterizing corresponding ones of the DOMs when rendering the accessed web pages for presentation within a corresponding interface, e.g., a browsing window displayed on a corresponding display unit, such as display unit 114A.

At certain points during the current browser session, client device 102 may receive input (e.g., via input unit 114B) that initiates an exchange of data with one or more potential counterparties (e.g., in step 604). By way of example, the one or more potential counterparties may include a merchant associated with the accessed web pages, and the initiated data exchange may facilitate a transaction to purchase a product or a service offered for sale by the merchant, e.g., on a corresponding merchant website. In some instances, the provided input may identify, among other things, the product or service and a desired quantity of the product or service, and may establishes a digital "shopping cart" characterizing the initiated purchase transaction. Further, web browser 108 may generate and present interface elements representative of the provided input within the browser window, e.g., within a "checkout" page of the merchant website, and may perform operations that access and modify portions of the stored data characterizing corresponding ones of the DOMs in accordance with the provided input.

By way of example, the presented checkout page of the merchant website (e.g., checkout page 208 of FIG. 2B) may include information that identifies and characterizes user 101 and the merchant, along with further information that identifies the product or service involved in the initiated transaction and a selected shipping or delivery mechanism for the product or service (e.g., as specified within portions of the provided input). In some instances, and as described herein, the presented checkout page may also prompt user 101 to provide additional input, to client device 102 via input unit 114B, that identifies a shipping address, payment data, or values of other parameters that facilitate an execution of the initiated purchase transaction by client device 102, e.g., by executed web browser 108.

Prior to the provision of the additional input by user 101, client device 102 may perform any of the exemplary processes described herein to detect the initiation of the data exchange, interrupt the current browser session, and further, obtain contextual data characterizing the initiated data exchange (e.g., in step 606). For instance, and as described herein, client device 102 may execute context discovery engine 110 that, in conjunction with executed web browser 108, identifies and extracts contextual data characterizing the initiated purchase transaction from locally stored information that specifies a page structure of the merchant checkout page.

Examples of context discovery engine 110 include, but are not limited to, an executable mobile application (e.g., mobile application 302 of FIG. 3A), an extension or add-on compatible with web browser 108 (e.g., browser extension 312 of FIG. 3B), elements of executable code or instructions (e.g., JavaScript™ elements 322), and a W3C™-compatible payment application (W3C™-compatible payment application 340 of FIG. 3D). Further, and as described herein, the contextual data may include information that identifies and characterizes the initiated data exchange or purchase transaction, and additionally, or alternatively, information that identifies and characterizes user 101, client device 102, or the counterparty to the initiated data exchange or purchase transaction.

Additionally, client device 102 may perform any of the exemplary processes described herein to authenticate an identity of user 101 based on locally maintained authentication credentials exchanges across network 120 with one or more additional network-connected computing systems, such as context discovery system 130 (e.g., in step 608). For example, the locally maintained authentication credentials may enable user 101 to access a digital portion of web page associated with, or hosted by, context discovery system 130, and may include, but are not limited to, an alphanumeric user name or login credential, an alphanumeric password, or a biometric authentication credential (e.g., a digital image of user 101's face, a fingerprint scan, etc.).

In one instance, if client device 102 and/or context discovery system 130 were unable to authenticate the identity of user 101 based on the locally maintained authentication credentials (e.g., step 608; NO), client device 102 may determine that user 101 is not a registered customer of context discovery system 130, and client device 102 may perform operations that await the additional input from user 101 that facilitates an execution of the initiated data exchange, e.g., the shipping address, payment data, or values of other parameters the initiated purchase transaction described herein (e.g., in step 610). Client device 102 may perform further operations that execute the initiated data exchange, e.g., the initiated purchase transaction, in accordance with the contextual data and the additional input (e.g., in step 612), and exemplary process 600 is complete in step 614.

Alternatively, if client device 102 and/or context discovery system 130 were to authenticate successfully the identity of user 101 based on the locally maintained authentication credentials (e.g., step 608; YES), client device 102 may perform any of the exemplary processes described herein to transmit the extracted contextual data to context discovery system 130 across a secure, programmatic channel of communication (e.g., in step 616). In some examples, context discovery system 130 may perform any of the exemplary processes described herein to identify a data type available for use in the initiated data exchange that is consistent with a specified preference of user 101, portions of the contextual data, or with information characterizing one or more prior data exchanges, and to obtain tokenized data representative of the available data type. Context discovery system 130 may also perform additional, or alternate, operations to identify one or more services that are available to user 101 and further, that are consistent with portions of the contextual data and with additional data characterizing user 101 or a counterparty to the initiated data exchange.

In some instances, client device 102 may receive a response to the transmitted contextual data from context discovery system 130 across the secure, programmatic communications channel (e.g., in step 618). As described herein, the received response may include tokenized data, such as a digital token, that represents the data type available for use in the initiated data exchange (e.g., the payment instrument available to fund the initiated purchase transaction), and that include other parameter values that facilitate the execution of the initiated data exchange or purchase transaction. For example, the digital token may correspond to a digital payment token, which may include tokenized payment data that characterizes the available payment instrument (e.g., a tokenized account number, expiration date, or card verification code) and in some instances, shipping data that specifies a shipping or delivery address for the initiated purchase transaction (e.g., the billing address of the available payment instrument). Further, in additional instances, the received response may also include service data, which identifies and characterize one or more of the available services selected by context discovery system 130 for provisioning to client device 102 during the current browser session.

In step 620, client device 102 may parse the received response to extract portions of the tokenized data, and may perform any of the exemplary processes described herein to render portions of the tokenized data within portions of a particular web page, e.g. within certain payment or shipping fields of the checkout page of the merchant website, during the current browser session. Client device 102 may also parse the received response to detect a presence, or a lack, of service data characterizing the one or more services selected for provisioning during the current browser session (e.g., in step 622).

If client device 102 were to determine that the received response fails to include the service data characterizing the selected services (e.g., step 622; NO), client device 102 may perform any of the exemplary processes described herein to execute automatically the initiated data exchange, e.g., the purchase transaction, in accordance with portions of the tokenized data and without additional input from user 101 (e.g., in step 624). Exemplary process 600 is then complete in step 614.

Alternatively, if client device 102 were to detect the presence of the service data within the received response (e.g., step 622; YES), client device 102 may parse the received response to identify and extract the portions of the service and/or layout data that characterize the one or more services selected for provisioning during the current browser session (e.g., in step 626). Client device 102 may perform any of the exemplary processes described herein to render the extract portions of the service and/or layout data for presentation on the particular webpage associated with the initiated data exchange (e.g., the checkout page of the merchant website), and to provision the one or more selected services to user 101 during the current browser session (e.g., in step 628).

As described herein, and upon provisioning of the one or more selected services to user 101, client device 102 may perform any of the exemplary processes described herein to automatically execute the initiated data exchange, e.g., the purchase transaction, in accordance with portions of the tokenized data and without additional input from user 101 (e.g., in step 624). Exemplary process 600 is then complete in step 614.

Figure 7:
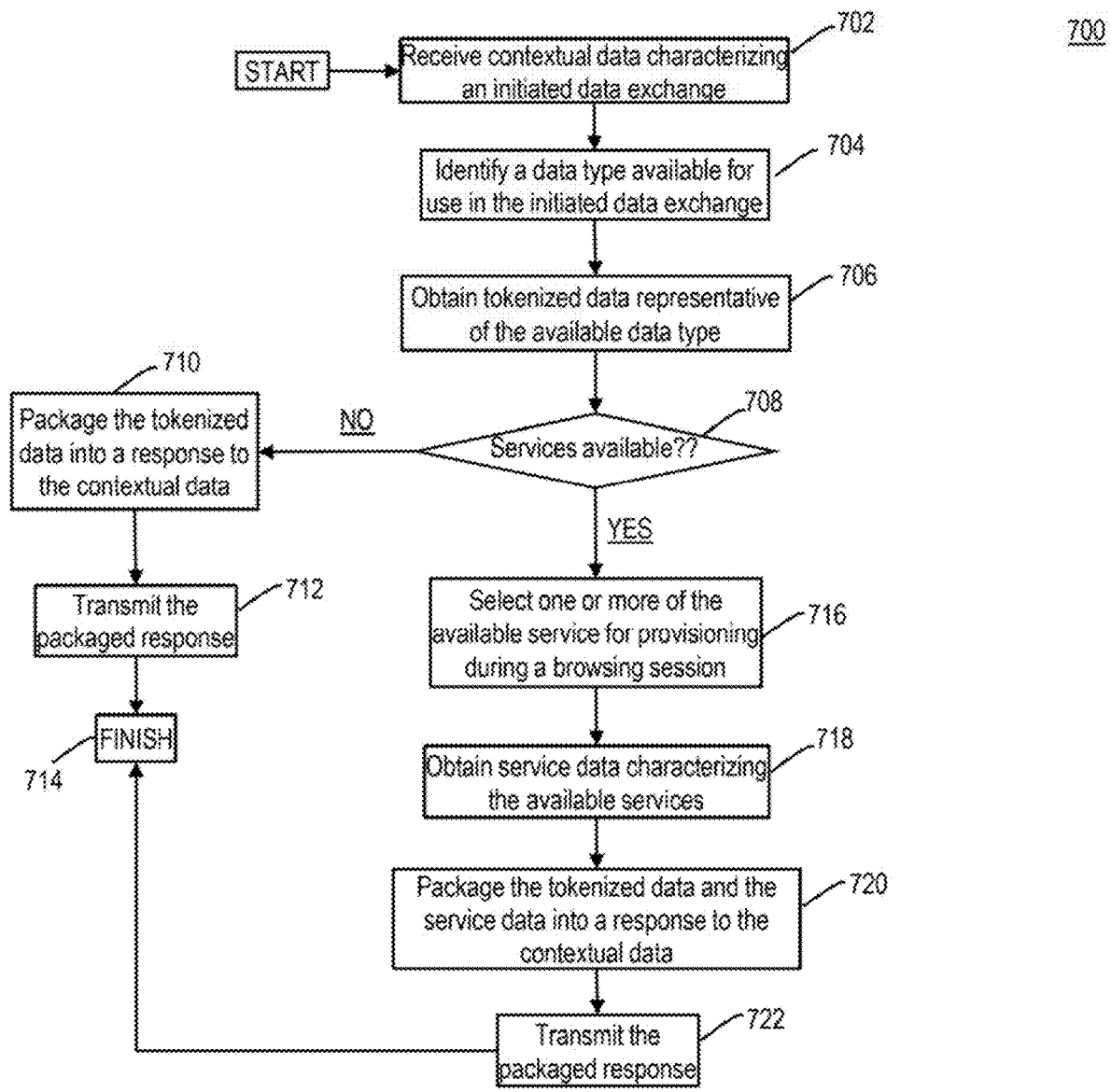

FIG. 7 is a flowchart of an exemplary process 700 for provisioning a digital token to a network-connected client device in real-time based on contextual data characterizing a current browser session. In some instances, context discovery system 130 may perform all or a portion of the steps of exemplary process 700, which include, but are not limited to, identifying a data type available for use in an initiated exchange of data that is consistent with one or more user-specified preferences, contextual data characterizing the initiated data exchange, or with information characterizing one or more data exchanges, and obtaining tokenized data representative of the available data type, and provisioning the tokenized data to a network-connected client device, either alone or in conjunction with service data identifying one or more available service that are consistent with portions of the contextual data.

Referring to FIG. 7, context discovery system 130 may receive contextual data characterizing an initiated exchange of data across a secure, programmatic interface (e.g., in step 702). In some examples, the initiated data exchange may correspond to a purchase transaction initiated between user 101 and a corresponding counterparty, such as a merchant, during a browser session established by a web browser executed by client device 102, e.g., web browser 108 of FIG. 1. Further, and as described herein, the received contextual data may include, but is not limited to, information and parameter values that characterize the initiated purchase transaction (e.g., as extracted by client device 102 from locally stored data specifying a page structure or document object model (DOM) of a presented checkout page of a merchant website), user 101 (e.g., a user identifier), or the counterparty (e.g., a URL of the merchant website, a merchant classification code (MCC) assigned to the merchant, etc.).

Based on portions of the received contextual data, context discovery system 130 may perform any of the exemplary processes described herein to identify data type available for use in the initiated data exchange and additionally, or alternatively, values of other parameters that facilitate an execution of the initiated data exchange (e.g., in step 704). As described herein, the available data type may correspond to a payment instrument held by user 101 and available to fund the initiated purchase transaction, and the other parameter values include, among other things, a shipping address for the purchase product or service (e.g., a billing address of the available payment instrument).

In one example, in step 704, context discovery system 130 may perform any of the exemplary processes described herein to identify the available data type (e.g., the available payment instrument) and/or the other parameter values based on information identifying and characterizing one or more preferences specified by user 101 (e.g., as maintained within preference data 428 of customer database 132). In other instances, also in step 704, context discovery system 130 may perform any of the exemplary processes described herein to identify the available data type (e.g., the available payment instrument) and/or the other parameter values based on an application of one or more machine learning algorithms or adaptive processes to data characterizing one or more prior exchanges of data or prior purchase transactions (e.g., as maintained within transaction database 136).

Referring back to FIG. 7, context discovery system 130 may perform any of the exemplary processes described herein to obtain tokenized data, such as a digital token, representative of the available data type and/or the other parameter values, and to store the tokenized data within a locally accessible memory (e.g., in step 706). For example, and as described herein, context discovery system 130 may receive all or a portion of the tokenized data from one or more network-connected computing systems, such as tokenization system 170, across a secure, programmatic channel of communications. In other examples, and without limitation, context discovery system 130 may perform any of the exemplary processes described herein to generate all or a portion of the tokenized data.

As described herein, the tokenized data may include a digital payment token that includes a tokenized account number, expiration date, or card verification value of the selected payment instrument, and may possess no extrinsic or exploitable value to malicious third parties operating within environment 100. In other instances, the tokenized data may also include a billing address for the selected payment instrument, and additionally or alternatively, a name of the cardholder or other information that facilitates a completion of the initiated purchase transaction, and an authorization of a corresponding payment, e.g., using the selected payment instrument.

Referring back to FIG. 7, context discovery system 130 may perform any of the exemplary processes described herein to identify one or more services available for provisioning to client device 102, and to user 101, during a current browser session established by client device 102 (e.g., in step 708). For example, and as described herein, each of the available services may be associated with one or more elements of triggering data (e.g., as maintained within service data store 138 of FIG. 1), which specifies triggering criteria that, when exhibited by the initiated data exchange (or purchase transaction) or by user 101, triggers a provision of a corresponding one of the available services using any of the exemplary processes described herein.

As described herein, the triggering criteria for a corresponding one of the available services may specify: (i) one or more parameter values that, when exhibited by the initiated purchase transaction, would trigger the provisioning of the corresponding service during the currently interrupted browser session; (ii) a value of one or more demographic parameters that, when exhibited by user 101, would trigger the provisioning of the corresponding service during the currently interrupted browser session; and/or (iii) a value of one or more counterparty parameters (e.g., a merchant name, data characterizing a merchant class, such as an assigned MCC, a merchant URL, etc.) that, when exhibited by the counterparty to the initiated data exchange or purchase transaction, would trigger the provisioning of the corresponding service. In some examples, context discovery system 130 may perform any of the exemplary processes described herein to select a corresponding one of the available services for provisioning to client device 102 based on a determined consistency between the triggering criteria of the corresponding service and portions of the received contextual data additional data characterizing user 101 or the counterparty.

In one instance, if context discovery system 130 were to determine that the portions of the contextual data and the additional data fail to triggering the provisioning of any available service (e.g., step 708; NO), context discovery system 130 may perform any of the exemplary processes described herein to package the tokenized data into a response to the received contextual data (e.g., in step 710). Context discovery system 130 may transmit the packaged response across network 120 to client device 102 via a secure, programmatic interface (e.g., in step 712), and exemplary process 700 is then complete in step 714.

Alternatively, if context discovery system 130 were to determine that the portions of the contextual data and the additional data trigger the provisioning of one or more of the available services (e.g., step 708; YES), context discovery system 130 may select the one or more available services for provisioning to client device 102 during the current browser session (e.g., in step 716). Context discovery system 130 may perform any of the exemplary processes described herein to obtain service data that characterizes each of the selected services, such as, but not limited to, a unique identifier of each of the selected services and locally maintained layout data associated with each of the available services (e.g., in step 718). Examples of the layout data include, but are not limited to, portions of HTML files, files that include other markup languages, or elements of executable code or script, such as JavaScript™ embedded within the HTML files.

In some instances, context discovery system 130 may perform any of the exemplary processes described herein to package portions of the tokenized data and the service data into a response to the received contextual data (e.g., in step 720), and to transmit the packaged response across network 120 to client device 102 via a secure, programmatic interface (e.g., in step 722). Exemplary process 700 is then complete in step 714.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including web browser 108, context discovery engine 110, predictive engine 139, mobile application 306, mobile application 312, JavaScript™ elements 322, W3C™ payment request API 334, W3C™-compatible payment application 340, routing module 404, API 406, authentication module 410, routing module 418, management module 424, token request module 436, routing module 440, API 444, token retrieval module 446, response module 452, routing module 456, API 458, service selection engine 502, and service provisioning module 510, can be implemented as one or more computer programs, i.e., one or more modules of computer program instructions encoded on a tangible non-transitory program carrier for execution by, or to control the operation of, a data processing apparatus (or a computing system).

Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A device, comprising:
   a communications unit;
   a storage unit storing instructions; and
   at least one processor coupled to the communications unit and the storage unit, the at least one processor being configured to execute the instructions to:
   load, from the storage unit, interface data associated with a digital interface, the digital interface being generated by a first application program executed by the at least one processor;
   obtain, from the interface data, first information that characterizes a purchase transaction initiated by the first application program;
   generate and transmit, via the communications unit, a first signal to a computing system, the first signal being transmitted through a programmatic interface associated with a second application program executed by the at least one processor, and the first signal comprising the first information and data that instructs the computing system to obtain a digital token associated with a payment instrument available for use in the purchase transaction;
   receive, via the communications unit, a second signal from the computing system that includes the digital token and service data that characterizes a service associated with the purchase transaction and available for provisioning to the device by the executed first application program;
   perform operations that extract second and third information from the digital token, the second information comprising tokenized data characterizing the available payment instrument, and the third information comprising a shipping address of a counterparty to the purchase transaction;
   perform operations that display portions of the first information within corresponding input fields of the digital interface associated with the purchase transaction, that display portions of the second information within corresponding input fields of the digital interface associated with the payment instrument, and that display a portion of the third information within an additional input field of the digital interface associated with the shipping address;
   generate an interface element that identifies the available service, and display the interface element at a position within the digital interface that obscures at least a portion of the input fields associated with the payment instrument; and
   perform operations that execute the purchase transaction in accordance with portions of the first, second, and third information, the purchase transaction being executed without receiving input from an operator of the device.

2. The device of claim 1, wherein:
   the executed first application program generates the interface data, the interface data comprising information characterizing a layout of interface elements displayed within the digital interface; and the at least one processor is further configured to, based on the interface data, display a portion of the first information that characterizes the purchase transaction within the digital interface.

3. The device of claim 1, wherein the interface data characterizes a document object model of web page rendered for presentation within the digital interface.

4. The device of claim 1, wherein:
the first application program comprises a web browser;
the digital interface comprises a browser window; and
the second application program comprises a mobile application, a browser extension, or one or more elements of executable script.

5. The device of claim 1, wherein the at least one processor is further configured to perform the operations that display the second information and the third information on the interface without receiving input from an operator of the device.

6. The device of claim 1, wherein the at least one processor is further configured to:
load one or more authentication credentials from the storage unit;
perform operations that authenticate an identity of an operator of the device based on the one or more authentication credentials; and
in response to the authentication, generate and transmit the first signal to the computing system.

7. The device of claim 1, wherein:
the device further comprises an input unit coupled to the at least one processor;
the at least one processor is further configured to:
receive, via the input unit, input data indicative of a selection of the available service; and
based on the input data, perform operations that provision the selected service to the device during a browser session associated with the purchase transaction and execute the purchase transaction in accordance with the first, second, and third information.

8. The device of claim 1, wherein:
the first information comprises a value of one or more parameters of the purchase transaction; and
the at least one processor is further configured to display the one or more parameter values within the corresponding portions of the digital interface associated with the purchase transaction.

9. The device of claim 1, wherein:
the executed first application program comprises a web browser, the digital interface comprises a first web page associated with the purchase transaction, and the available service comprises an available credit offer associated with the purchase transaction; and
the device further comprises an input unit coupled to the at least one processor; and
the at least one processor is further configured to:
receive, via the input unit, first input data indicative of a selection of the available credit offer;
based on the first input data, and during a browser session associated with the purchase transaction, perform operations that redirect at least a portion of the first information to a second web page associated with the credit offer; and
receive, via the input unit, second input data associated with portions of the second web page, and based on the second input data, redirect the web browser to the first web page during the browser session.

10. The device of claim 1, wherein the at least one processor is further configured to:

perform operations that extract fourth information from the digital token, the fourth information comprising a value of a parameter of the purchase transaction; and
perform operations that display a portion of the fourth information within an additional input field of the digital interface associated with the parameter value.

11. A computer-implemented method, comprising:
obtaining, by at least one processor, interface data associated with a digital interface, the digital interface being generated by a first application program executed by the at least one processor;
by at least one processor, obtaining, from the interface data, first information that characterizes purchase transaction initiated by the executed first application program;
generating and transmitting, by the at least one processor, a first signal to a computing system, the first signal being transmitted through a programmatic interface associated with a second application program executed by the at least one processor, and the first signal comprising the first information and data that instructs the computing system to obtain a digital token representative of a payment instrument available for use in the purchase transaction;
receiving, by the at least one processor, a second signal from the computing system that includes the digital token and service data that characterizes a service associated with the purchase transaction and available for provisioning to the device by the executed first application program;
performing, by the at least one processor, operations that extract second and third information from the digital token, the second information comprising tokenized data characterizing the available payment instrument, and the third information comprising a shipping address of a counterparty to purchase transaction;
performing, using the at least one processor, operations that display portions of the first information within corresponding input fields of the digital interface associated with the purchase transaction, that display portions of the second information within corresponding input fields of the digital interface associated with the payment instrument, and that display a portion of the third information within an additional input field of the digital interface associated with the shipping address;
using the at least one processor, generating an interface element that identifies the available service, and displaying the interface element at a position within the digital interface that obscures at least a portion of the input fields associated with the payment instrument; and
perform, using the at least one processor, operations that execute the purchase transaction in accordance with portions of the first, second, and third information, the purchase transaction being executed without receiving input from an operator of the device.

12. An apparatus, comprising:
a communications unit;
a storage unit storing instructions; and
at least one processor coupled to the communications unit and the storage unit, the at least one processor being configured to execute the instructions to:
receive a first signal via the communications unit, the first signal comprising first information characterizing a purchase transaction initiated at a client device, the first information being presented within a first portion of a digital interface generated by a first application program executed at the client device;

based on the first information, identify a payment instrument available for use in the purchase transaction, and obtain service data that characterizes a service associated with the purchase transaction and available for provisioning to the client device by the executed first application program;

receive, via the communications unit, a second signal comprising a digital token representative of the payment instrument; and generate and transmit a third signal to the client device via the communications unit, the third signal comprising the digital token and the service data, the third signal further comprising data that instructs the client device to: perform operations that extract, from the digital token, second information comprising tokenized data characterizing the payment instrument and display portions of the second information within corresponding input fields of the digital interface associated with the payment instrument;

perform operations that extract, from the digital token, third information comprising a shipping address of a counterparty to the purchase transaction, and display a portion of the third information within an additional input field of the digital interface associated with the shipping address; and perform operations that generate an interface element that identifies the available service, that display the interface element at a position within the digital interface that obscures at least a portion of the input fields associated with the payment instrument, and that execute the purchase transaction in accordance with portions of the first, second, and third information, the purchase transaction being executed without receiving input from an operator of the client device.

13. The apparatus of claim 12, wherein the client device is configured to execute a second application program that obtains the first information from interface data characterizing a web page rendered for presentation on the digital interface.

14. The apparatus of claim 13, wherein the at least one processor is further configured to:

receive the first signal from the client device via the communications unit, the first signal being received through a programmatic interface associated with the executed second application program; and transmit, via the communications unit, the second signal to the client device across the programmatic interface.

15. The apparatus of claim 12, wherein the at least one processor is further configured to:

receive a fourth signal from the client device via the communications unit, the fourth signal comprising one or more authentication credentials of an operator of the client device;

perform operations that authenticate an identity of the operator based on the one or more authentication credentials; and generate and transmit a fifth signal to the client device via the communications unit; the fifth signal comprising data confirming the authentication.

16. The apparatus of claim 12, wherein the at least one processor is further configured to generate and transmit, via the communications unit, a fourth signal to a computing system, the fourth signal comprising additional information identifying the available payment instrument, and the additional information instructing the computing system to generate the digital token.

17. The apparatus of claim 12, wherein the at least one processor is further configured to:

extract an identifier of the client device from the first information;

load, from the storage unit, preference data associated with the identifier; and identify the data type available for use in the data exchange based on a portion of the preference data.

18. The apparatus of claim 12, wherein the at least one processor is further configured to:

load, from the storage unit, transaction data that identifies and characterizes one or more prior purchase transactions initiated by the client device;

apply a trained machine learning or adaptive process to portions of the first information and the transaction data; and identify the payment instrument available for use in the purchase transaction based on the application of the trained machine learning or adaptive process to the portions of the first information and the transaction data.

19. The apparatus of claim 12, wherein the at least one processor is further configured to:

load, from the storage unit, the service data that characterizes the available service, the service data specifying a triggering criterion for the available service;

determine that the triggering criterion for the available service is consistent with a portion of the first information; and generate and transmit, via the communications unit, the third signal comprising the digital token and the service data to the client device.

* * * * *